(12) United States Patent
Pulitzer

(10) Patent No.: US 6,928,413 B1
(45) Date of Patent: Aug. 9, 2005

(54) METHOD OF PRODUCT PROMOTION

(75) Inventor: Jovan Hutton Pulitzer, Dallas, TX (US)

(73) Assignee: L.V. Partners, L.P., Dallas, TX (US)

(*) Notice: Subject to any disclaimer, the term of this patent is extended or adjusted under 35 U.S.C. 154(b) by 0 days.

(21) Appl. No.: 09/483,487

(22) Filed: Jan. 14, 2000

Related U.S. Application Data

(63) Continuation-in-part of application No. 09/378,220, filed on Aug. 19, 1999, which is a continuation-in-part of application No. 09/151,530, filed on Sep. 11, 1998.

(51) Int. Cl.[7] .............................................. G06F 17/60
(52) U.S. Cl. ......................................... 705/14; 463/40
(58) Field of Search ................................ 705/1, 10, 14; 775/82, 83; 463/40, 42; 709/219, 224

(56) References Cited

U.S. PATENT DOCUMENTS

| | | | |
|---|---|---|---|
| 3,668,312 A | 6/1972 | Yamamoto et al. | ............ 348/17 |
| 4,002,886 A | 1/1977 | Sundelin | ............... 235/61.7 R |
| 4,042,792 A | 8/1977 | Pakenham et al. | ............. 179/90 |
| 4,365,148 A | 12/1982 | Whitney | ...................... 235/383 |
| 4,621,259 A | 11/1986 | Schepers et al. | ............. 345/180 |
| 4,654,482 A | 3/1987 | DeAngelis | .................... 379/95 |
| 4,780,599 A | 10/1988 | Baus | ........................... 235/383 |

(Continued)

FOREIGN PATENT DOCUMENTS

| | | | | |
|---|---|---|---|---|
| EP | 0 961 250 A2 | 12/1999 | ........... | G07F/19/00 |
| JP | 10188140 A | 12/1996 | ............ | G07G/1/12 |
| WO | WO 95/10813 | 10/1994 | ......... | G06F/15/403 |
| WO | WO 96/07146 | 9/1995 | ............ | G06F/17/00 |
| WO | WO 97/02074 | * 1/1997 | ................ | 705/14 X |
| WO | WO 97/37319 | 2/1997 | ............ | G06K/7/10 |
| WO | WO 97/26061 | * 7/1997 | ................ | 705/14 X |
| WO | WO 98/09243 | 8/1997 | ........... | G06F/19/00 |
| WO | WO 98/03923 | 1/1998 | ......... | G06F/15/163 |
| WO | WO 98/06055 | 2/1998 | ......... | G06F/163/00 |
| WO | WO 98/19259 | 5/1998 | ......... | G06F/17/60 |
| WO | WO 98/40823 | 9/1998 | ........... | G06F/13/00 |
| WO | WO 99/63457 | 6/1999 | ........... | G06F/17/30 |

OTHER PUBLICATIONS

Going Beyond the Banner by Cathy Taylor from Brandweek, v XXXVII, n28, IQ22+, dated Jul. 8, 1996.*
"Distributing Uniform Resource Locators as Bar Code Images", IBM Technical Disclosure Bulleting, Jan. 1996.
"Bar Code Method for Automating Catalog Orders", IBM Technical Disclosure Bulletin, Sep. 1998.

*Primary Examiner*—Eric Stamber
(74) *Attorney, Agent, or Firm*—Howison & Arnott, L.L.P.

(57) ABSTRACT

A method of promoting a product. A user at a user location (100) is induced to obtain a first product having a unique ID from a first vendor to win a prize. The user registers the product via a user computer (102) connected on-line to a central registration server (108) across a packet-switched network (104) by completing a user profile and transmitting the user profile and unique ID to a central registration server (108) having a profile database stored on a profile database unit (110). Promoting the product in conjunction with an event at an event location (114), and in response to a triggering event occurring during the event, a tone control system (117) causes a tone signal to be transmitted in the broadcast signal using a broadcast system (116). The tone signal is coupled to the user computer (102) and decoded to enable the computer (102) to automatically connect to a web server having a prize-winning phrase containing advertisement of the second product. A unique ID is then arbitrarily selected, and used to perform a matching operation on the user profile database of the profile database unit (110) using an event computer (118), in order to obtain the associated telephone number of the user. A call is then placed to the user with an event handset (122) over a PSTN (124) to a viewer handset (126). The user is then prompted for the prize-winning phrase. If correct, the user is awarded the prize.

7 Claims, 10 Drawing Sheets

U.S. PATENT DOCUMENTS

| | | | |
|---|---|---|---|
| 4,785,296 A | 11/1988 | Tabata et al. | 340/731 |
| 4,816,904 A | 3/1989 | McKenna et al. | 348/13 |
| 4,817,136 A | 3/1989 | Rhoads | 379/375 |
| 4,833,308 A | 5/1989 | Humble | 235/383 |
| 4,841,132 A | 6/1989 | Kajitani et al. | 235/472 |
| 4,845,634 A | 7/1989 | Vitek et al. | 364/468 |
| 4,894,789 A | 1/1990 | Yee | 348/552 |
| 4,899,370 A | 2/1990 | Kameo et al. | 379/104 |
| 4,901,073 A | 2/1990 | Kibrick | 341/13 |
| 4,905,094 A | 2/1990 | Pocock et al. | 386/106 |
| 4,907,264 A | 3/1990 | Seiler et al. | 379/216 |
| 4,916,293 A | 4/1990 | Cartlidge et al. | 235/375 |
| 4,937,853 A | 6/1990 | Brule et al. | 379/91 |
| 4,947,028 A | 8/1990 | Gorog | 235/380 |
| 4,959,530 A | 9/1990 | O'Connor | 235/383 |
| 4,975,948 A | 12/1990 | Andresen et al. | 379/355 |
| 4,982,346 A * | 1/1991 | Girouard et al. | 705/14 X |
| 4,984,155 A | 1/1991 | Geier et al. | 364/401 |
| 5,038,023 A | 8/1991 | Saliga | 235/385 |
| 5,054,096 A | 10/1991 | Beizer | 382/41 |
| 5,088,045 A | 2/1992 | Shimanaka et al. | 364/468 |
| 5,111,391 A | 5/1992 | Fields et al. | 364/401 |
| 5,115,326 A | 5/1992 | Burgess et al. | 358/440 |
| 5,128,752 A | 7/1992 | Von Kohorn | 358/84 |
| 5,144,654 A | 9/1992 | Kelley et al. | 379/356 |
| 5,161,037 A | 11/1992 | Saito | 358/468 |
| 5,161,214 A | 11/1992 | Addink et al. | 395/145 |
| 5,182,705 A | 1/1993 | Barr et al. | 364/401 |
| 5,189,630 A | 2/1993 | Barstow et al. | 364/514 |
| 5,191,525 A | 3/1993 | LeBrun et al. | 364/419 |
| 5,198,644 A | 3/1993 | Pfeiffer et al. | 235/383 |
| 5,235,654 A | 8/1993 | Anderson et al. | 382/61 |
| 5,241,402 A | 8/1993 | Aboujaoude et al. | 358/406 |
| 5,243,531 A | 9/1993 | DiPippo et al. | 364/468 |
| 5,247,347 A | 9/1993 | Litteral et al. | 348/7 |
| 5,262,860 A | 11/1993 | Fitzpatrick et al. | 348/461 |
| 5,285,278 A | 2/1994 | Holman | 348/10 |
| 5,287,181 A | 2/1994 | Holman | 348/473 |
| 5,288,976 A | 2/1994 | Citron et al. | 235/375 |
| 5,296,688 A | 3/1994 | Hamilton et al. | 235/375 |
| 5,304,786 A | 4/1994 | Pavlidis et al. | 235/462 |
| 5,305,195 A | 4/1994 | Murphy | 705/1 |
| 5,319,454 A | 6/1994 | Schutte | 348/5.5 |
| 5,324,922 A | 6/1994 | Roberts | 235/375 |
| 5,331,547 A | 7/1994 | Laszlo | 364/413.01 |
| 5,340,966 A | 8/1994 | Morimoto | 235/376 |
| 5,357,276 A | 10/1994 | Banker et al. | 348/7 |
| 5,362,948 A | 11/1994 | Morimoto | 235/376 |
| 5,382,779 A | 1/1995 | Gupta | 235/383 |
| 5,386,298 A | 1/1995 | Bronnenberg et al. | 358/403 |
| 5,398,336 A | 3/1995 | Tantry et al. | 395/600 |
| 5,405,232 A | 4/1995 | Lloyd et al. | 414/280 |
| 5,418,713 A | 5/1995 | Allen | 364/403 |
| 5,420,403 A | 5/1995 | Allum et al. | 235/375 |
| 5,420,943 A | 5/1995 | Mak | 382/313 |
| 5,424,524 A | 6/1995 | Ruppert et al. | 235/462 |
| 5,438,355 A | 8/1995 | Palmer | 348/1 |
| 5,446,490 A | 8/1995 | Blahut et al. | 348/7 |
| 5,446,919 A | 8/1995 | Wilkins | 455/6.2 |
| 5,491,508 A | 2/1996 | Friedell et al. | 348/16 |
| 5,493,107 A | 2/1996 | Gupta et al. | 235/383 |
| 5,519,878 A | 5/1996 | Dolin, Jr. | 395/800 |
| 5,530,852 A | 6/1996 | Meske, Jr. et al. | 396/600 |
| 5,570,295 A | 10/1996 | Isenberg et al. | 379/90.01 |
| 5,572,643 A | 11/1996 | Judson | 395/793 |
| 5,592,551 A | 1/1997 | Lett et al. | 380/20 |
| 5,594,226 A | 1/1997 | Steger | 235/379 |
| 5,602,377 A | 2/1997 | Beller et al. | 235/462 |
| 5,604,542 A | 2/1997 | Dedrick | 348/552 |
| 5,640,193 A | 6/1997 | Wellner | 348/7 |
| 5,649,186 A | 7/1997 | Ferguson | 395/610 |
| 5,664,110 A | 9/1997 | Green et al. | 705/26 |
| 5,671,282 A | 9/1997 | Wolff et al. | 380/25 |
| 5,675,721 A | 10/1997 | Freedman et al. | 395/129 |
| 5,682,540 A | 10/1997 | Klotz, Jr. et al. | 395/766 |
| 5,694,163 A | 12/1997 | Harrison | 348/13 |
| 5,708,780 A | 1/1998 | Levergood et al. | 709/229 |
| 5,710,887 A | 1/1998 | Chelliah et al. | 395/226 |
| 5,715,314 A | 2/1998 | Payne et al. | 705/78 |
| 5,724,424 A | 3/1998 | Gifford | 705/79 |
| 5,745,681 A | 4/1998 | Levine et al. | 395/200.3 |
| 5,754,906 A | 5/1998 | Yoshida | 396/448 |
| 5,757,917 A | 5/1998 | Rose et al. | 380/25 |
| 5,761,606 A | 6/1998 | Wolzien | 455/6.2 |
| 5,764,906 A | 6/1998 | Edelstein et al. | 395/200.49 |
| 5,765,176 A | 6/1998 | Bloomberg | 707/514 |
| 5,768,528 A | 6/1998 | Stumm | 709/231 |
| 5,774,664 A | 6/1998 | Hidary et al. | 395/200 |
| 5,774,870 A | 6/1998 | Storey | 705/14 |
| 5,778,367 A | 7/1998 | Wesinger, Jr. et al. | 707/10 |
| 5,790,793 A | 8/1998 | Higley | 709/218 |
| 5,791,991 A | 8/1998 | Small | 463/41 |
| 5,794,210 A | 8/1998 | Goldhaber et al. | 705/14 |
| 5,796,952 A | 8/1998 | Davis et al. | 305/200.54 |
| 5,804,803 A | 9/1998 | Cragun et al. | 235/375 |
| 5,815,776 A | 9/1998 | Nukada | 399/174 |
| 5,832,223 A | 11/1998 | Hara et al. | 395/200.47 |
| 5,833,468 A | 11/1998 | Guy et al. | 434/350 |
| 5,848,202 A | 12/1998 | D'Eri et al. | 382/306 |
| 5,848,413 A | 12/1998 | Wolff | 707/10 |
| 5,854,897 A | 12/1998 | Radziewicz et al. | 709/224 |
| 5,864,823 A | 1/1999 | Levitan | 105/14 |
| 5,869,819 A | 2/1999 | Knowles et al. | 235/375 |
| 5,905,248 A | 5/1999 | Russell et al. | 235/462 |
| 5,905,251 A | 5/1999 | Knowles | 235/472.01 |
| 5,905,665 A | 5/1999 | Rim | 364/746 |
| 5,905,865 A | 5/1999 | Palmer et al. | 395/200.47 |
| 5,907,793 A | 5/1999 | Reams | 455/3.1 |
| 5,913,210 A | 6/1999 | Call | 707/4 |
| 5,915,090 A | 6/1999 | Joseph et al. | 709/202 |
| 5,916,024 A * | 6/1999 | Von Kohorn | 463/40 |
| 5,917,725 A * | 6/1999 | Thacher et al. | 463/40 |
| 5,918,214 A | 6/1999 | Perkowski | 705/27 |
| 5,925,865 A | 7/1999 | Steger | 235/379 |
| 5,929,850 A | 7/1999 | Broadwin et al. | 345/327 |
| 5,932,863 A | 8/1999 | Rathus et al. | 235/462.15 |
| 5,933,829 A | 8/1999 | Durst et al. | 707/10 |
| 5,948,061 A | 9/1999 | Merriman et al. | 709/219 |
| 5,957,695 A | 9/1999 | Redford et al. | 434/307 R |
| 5,960,411 A | 9/1999 | Hartman et al. | 705/26 |
| 5,961,603 A | 10/1999 | Kunkel et al. | 709/229 |
| 5,970,471 A | 10/1999 | Hill | 705/26 |
| 5,970,472 A | 10/1999 | Allsop et al. | 705/26 |
| 5,971,277 A | 10/1999 | Cragun et al. | 235/462.01 |
| 5,974,443 A | 10/1999 | Jeske | 709/202 |
| 5,974,451 A | 10/1999 | Simmons | 709/218 |
| 5,976,833 A | 11/1999 | Furukawa et al. | 435/69.1 |
| 5,978,773 A | 11/1999 | Hudetz et al. | 709/219 |
| 5,991,739 A | 11/1999 | Cupps et al. | 705/26 |
| 5,992,752 A | 11/1999 | Wilz, Sr. et al. | 235/472.01 |
| 5,995,105 A | 11/1999 | Reber et al. | 345/356 |
| 6,002,394 A | 12/1999 | Schein et al. | 345/327 |
| 6,003,073 A | 12/1999 | Solvason | 709/219 |
| 6,006,257 A | 12/1999 | Slezak | 709/219 |
| 6,009,410 A | 12/1999 | LeMole et al. | 709/219 |
| 6,009,465 A | 12/1999 | Decker et al. | 709/219 |
| 6,012,102 A | 1/2000 | Shachar | 710/5 |
| 6,018,764 A | 1/2000 | Field et al. | 709/217 |
| 6,049,539 A | 4/2000 | Lee et al. | 370/355 |
| 6,061,660 A * | 5/2000 | Eggleston et al. | 705/14 X |
| 6,064,979 A | 5/2000 | Perkowski | 705/26 |
| 6,108,656 A | 8/2000 | Durst et al. | 707/10 |
| 6,251,016 B1 * | 6/2001 | Tsuda et al. | 463/42 |
| 6,251,017 B1 * | 6/2001 | Leason et al. | 463/42 |
| 6,356,876 B1 * | 3/2002 | Lingham | 705/14 |
| 2001/0034654 A1 * | 10/2001 | Vigil et al. | |
| 2002/0069104 A1 * | 6/2002 | Beach et al. | |

* cited by examiner

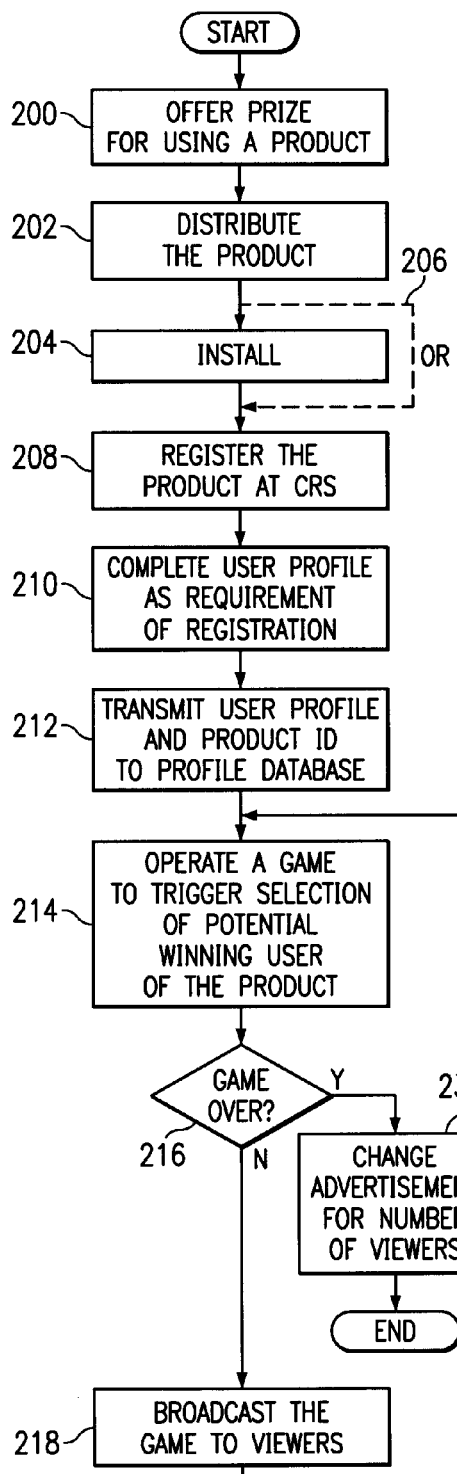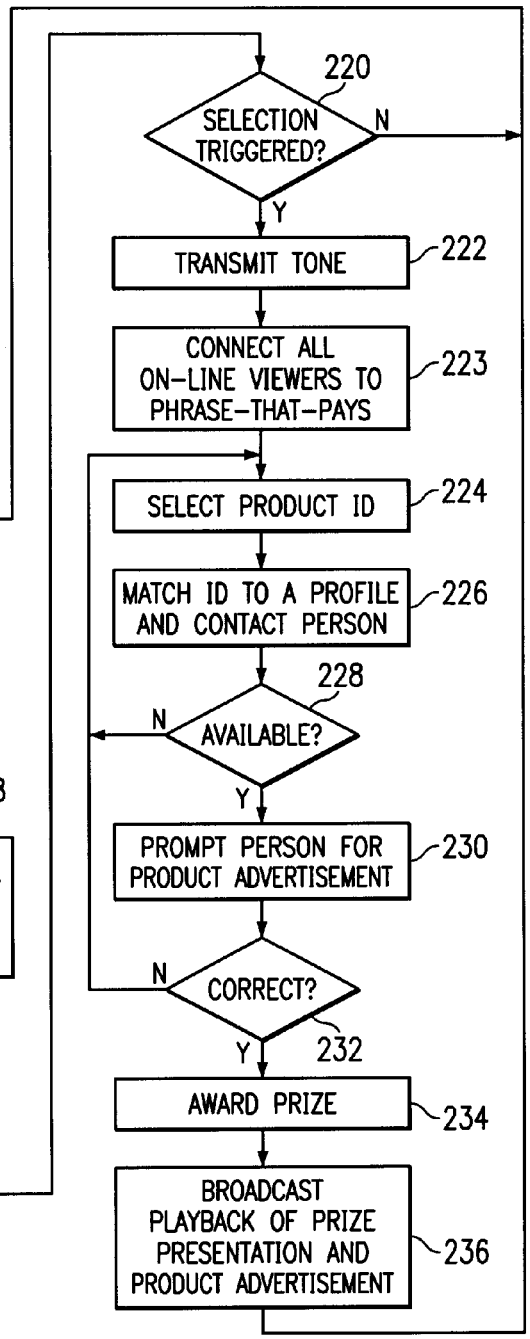
FIG. 2

PATH A: SOURCE TO ARS

| 700 | URL OF ARS | ADVERTISER PRODUCT CODE | URL OF SOURCE |

*FIG. 7a*

PATH B: ARS TO SOURCE

| 702 | URL OF SOURCE | URL OF ADVERTISER | URL OF ARS |

*FIG. 7b*

PATH C: SOURCE TO ADVERTISER

| 704 | URL OF ADVERTISER | REQUEST-FOR-INFORMATION | URL OF SOURCE |

*FIG. 7c*

PATH D: ADVERTISER TO SOURCE

| 706 | URL OF SOURCE | REQUESTED INFORMATION | URL OF ADVERTISER |

*FIG. 7d*

PATH E: ARS TO ADVERTISER (OPTIONAL)

| 708 | URL OF ADVERTISER | REQUEST-FOR-INFORMATION | URL OF SOURCE |

*FIG. 7e*

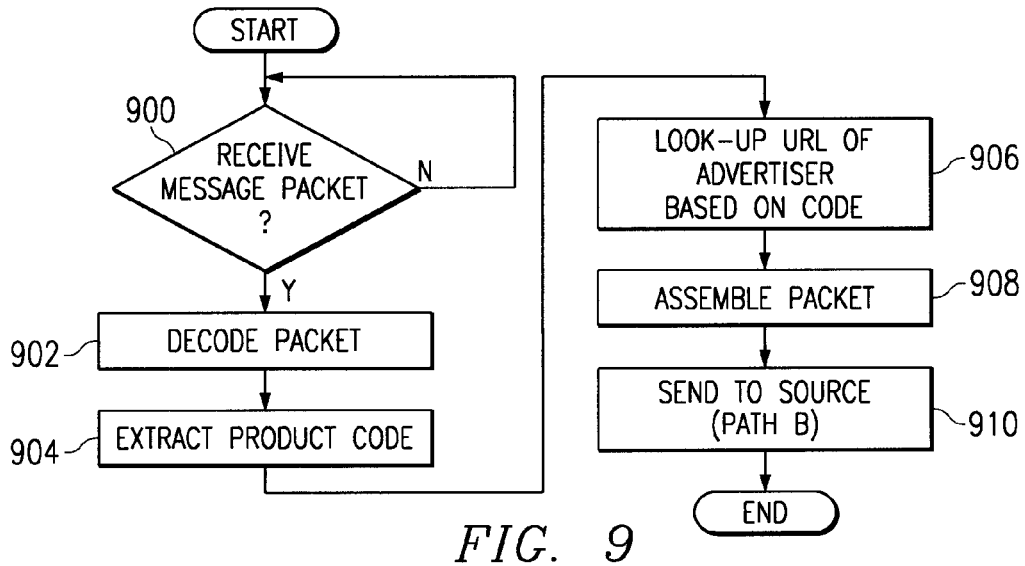

*FIG. 9*

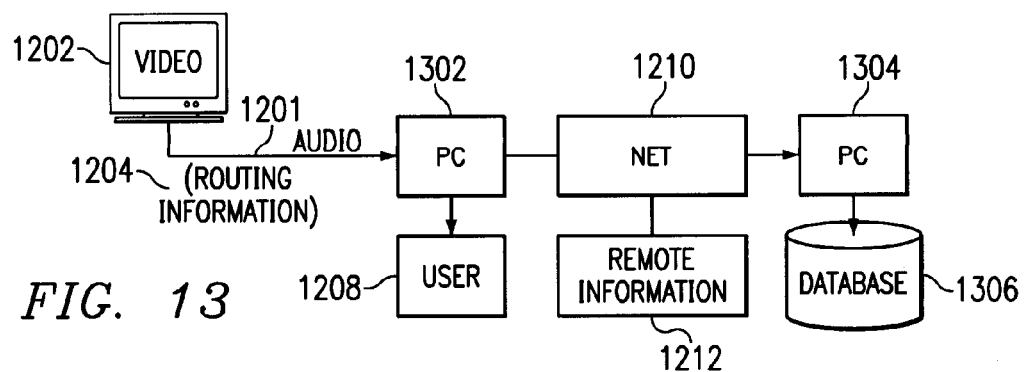
FIG. 13
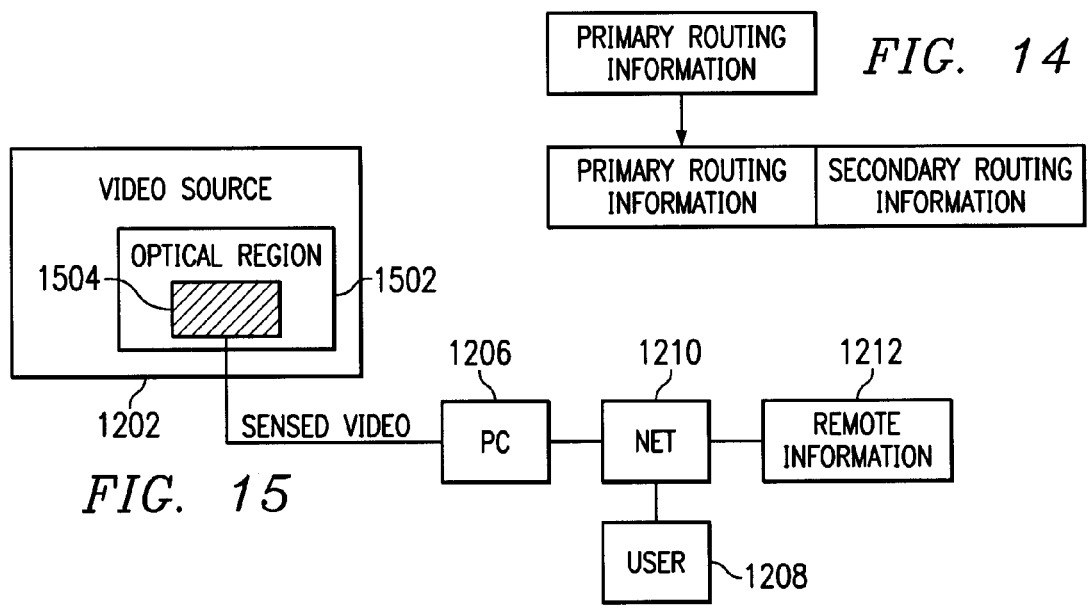
FIG. 14
FIG. 15
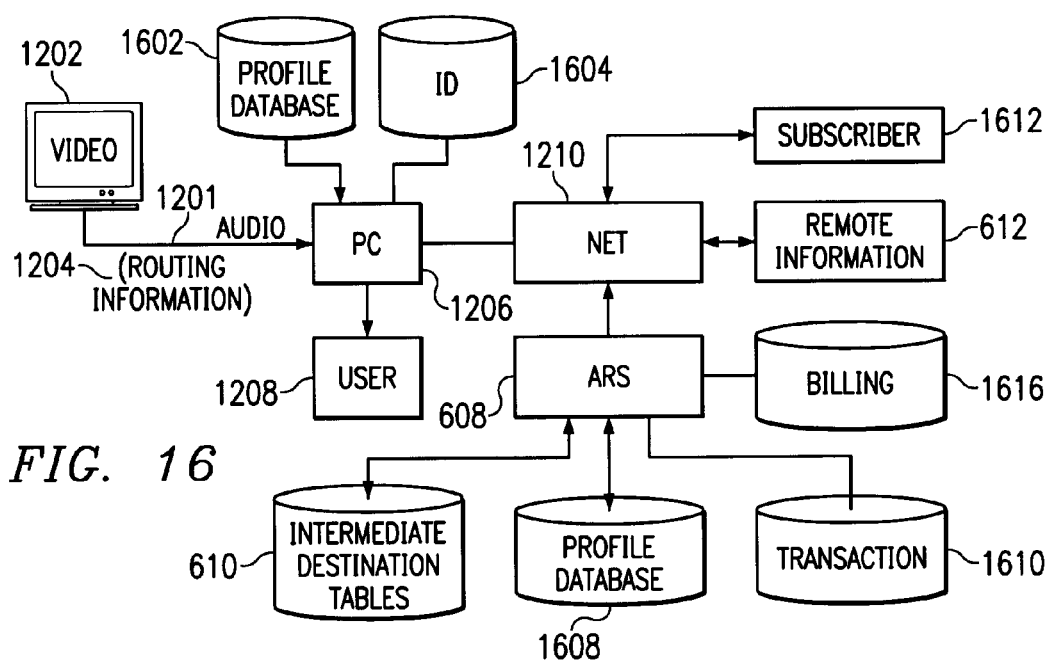
FIG. 16

METHOD OF PRODUCT PROMOTION

CROSS-REFERENCE TO RELATED APPLICATIONS

This application is a Continuation-in-Part of pending U.S. patent application Ser. No. 09/378,220 entitled "METHOD AND APPARATUS FOR CONTROLLING A COMPUTER FROM A REMOTE LOCATION," filed on Aug. 19, 1999, which is a Continuation-In-Part of pending U.S. patent application Ser. No. 09/151,530 and entitled, "METHOD FOR CONTROLLING COMPUTERS THROUGH A RADIO/TELEVISION COMMUNICATION HUB" filed on Sep. 11, 1998, and is related to pending U.S. patent application Ser. No. 09/151,471 entitled, "METHOD FOR INTERFACING SCANNED PRODUCT INFORMATION WITH A SOURCE FOR THE PRODUCT OVER A GLOBAL NETWORK" filed on Sep. 11, 1998, and is related to U.S. patent application Ser. No. 09/378,222 entitled, "METHOD AND APPARATUS FOR EMBEDDING ROUTING INFORMATION TO A REMOTE WEB SITE IN AN AUDIO/VIDEO TRACK" filed of equal date, and which is related to U.S. patent application Ser. No. 09/378,216 entitled "A METHOD FOR CONTROLLING A COMPUTER USING AN EMBEDDED UNIQUE CODE IN THE CONTENT OF VIDEO TAPE MEDIA".

TECHNICAL FIELD OF THE INVENTION

This invention is related to an architecture for product promotion, and more particularly, for using a broadcast system in conjunction with a packet-switched network to advertise the products.

BACKGROUND OF THE INVENTION

Advertising continues to be a major vehicle for exposing the advertiser's product to a potential customer. Several conventional "push" advertising mechanisms which have been in existence for communicating to potential customers comprise television, radio, billboards, and newspaper advertisements, all of which have played a major role in achieving the ultimate goal of making a sale to a customer by presenting the advertising to a general audience. However, with the stiff commercial competitiveness in existence in the marketplace today, vendors are seeking out new ways in which the potential customer can be reached to make the sale of a product.

The advent of a global communication packet-switched network, an example of which is the Internet, is providing an important new avenue for reaching the potential customer. Where the customer may not be reachable through broadcast advertising related to radio and television, he or she can now be reached through the Internet by directly communicating with the potential customer through their home computer system. Therefore, the potential customer base now becomes enormous. With the convergence of conventional broadcast system technologies and the global packet-switched communication technologies, like the Internet, new mechanisms using such technologies are desired to capture the attention of a potential customer for a short presentation of an advertisement.

SUMMARY OF THE INVENTION

The present invention disclosed and claimed herein, in one aspect thereof, comprises a method of promoting products. First and second products of respective first and second advertisers of a plurality of advertisers are provided. A user at a first location disposed on a first communication network is induced to obtain the first product with the opportunity to win a prize, and to register the first product over the first communication network. A gaming event is broadcast from a remote location over a second communication network to the user at the first location, the gaming event having one or more triggering events which initiate a selection process, the user being one of a plurality of selections in the selection process. Indicia are transmitted over the second broadcast network to the first location upon initiation of the selection process, the indicia triggering the presentation of prize-winning information to the user at the first location over the first communication network, the prize-winning information associated with the second product of the second advertiser. The user at the first location is ten contacted over a third communication network to obtain the prize-winning information, and awarding the prize to the user if the user responds with the prize-winning information.

In another aspect of the invention, a method of promoting a software package is disclosed. An inducement is provided to a user at a user location to obtain the software package in order to win a prize, the software package having a unique number associated therewith, and for use with a packet-switched network having the user location disposed thereon. The user registers the software package from the user location by completing a user profile, and transmitting the unique number and the user profile to a registration server disposed on the packet-switched network. Prize-winning information to the user is broadcast over the packet-switched network in response to a triggering event at an event location. After arbitrarily selecting the unique number associated with the software package of the user from a plurality of unique numbers, the registration server is accessed via an event computer disposed on the packet-switched network at the event location to obtain user profile information of the user. The user is then contacted at the user location to obtain the prize-winning information, using contact information obtained from the user profile information. The prize is then issued to the user when the prize-winning information is provided by the user.

In still another aspect of the invention, a method of promoting two unrelated products. A television broadcast network is provided for broadcasting information to a viewer at a viewer location during an event at an event location, the viewer location disposed on a packet-switched network. An inducement is broadcast to the viewer to obtain a first product in order to win a prize, the first product having a unique number associated therewith. The first product of the viewer is registered from the viewer location by providing viewer profile information, and transmitting the unique number and the viewer profile information to a registration server disposed on the packet-switched network. Indicia information is broadcast from the event location over the broadcast network to a television at the viewer location, the prize-winning information associated with a second product. A computer at the viewer location is automatically connected to a remote location on the packet-switched network in response to receiving the indicia information, to present to the user prize-winning information. In response to arbitrarily selecting the unique number associated with the first product from a plurality of unique numbers, the registration server is accessed using an event computer located at the event location to obtain the viewer profile information. The viewer is contacted at the viewer location to obtain the prize-winning information, using contact information obtained from the viewer profile information. The prize is then issued to the viewer when the prize-winning information is provided by the viewer.

In still another aspect of the invention, a method of obtaining user profile information of a user is disclosed. An inducement is provided to the user of a user location to obtain a product in order to win a prize, the product having a unique number associated therewith, the user location disposed on a packet-switched network. The product is registered from the user location by providing user profile information, and transmitting the unique number and the user profile information to a registration server disposed on the packet-switched network. An indicia is broadcast from an event location over a broadcast network to a receiving device at the user location. The user location is then automatically connected to a remote location on the packet-switched network in response to receiving the indicia information, to present to the user prize-winning information. In response to arbitrarily selecting the unique number associated with the product of the user from a plurality of unique numbers, the registration server is accessed via an event computer at the event location to obtain the user profile information of the user. Using contact information obtained from the user profile information, the user is contacted at the user location to obtain the prize-winning information, and issued the prize if the user provides the prize-winning information.

BRIEF DESCRIPTION OF THE DRAWINGS

For a more complete understanding of the present invention and the advantages thereof, reference is now made to the following description taken in conjunction with the accompanying Drawings in which:

FIG. 2 illustrates a flowchart of the process of the product promotion;

FIGS. 7a –7e illustrate the various message packets transmitted between the source PC and network servers used in the preferred embodiment;

FIG. 9 illustrates a flowchart of actions taken by the Advertiser Reference Server ("ARS") server;

FIG. 13 illustrates a more detailed, simplified block diagram of the embodiment of FIG. 12;

FIG. 14 illustrates a diagrammatic view of a method for performing the routing operation;

FIG. 15 illustrates a block diagram of an alternate embodiment utilizing an optical region in the video image for generating the routing information;

FIG. 16 illustrates a block diagram illustrating the generation of a profile with the disclosed embodiment;

DETAILED DESCRIPTION OF THE INVENTION

Figure 1:
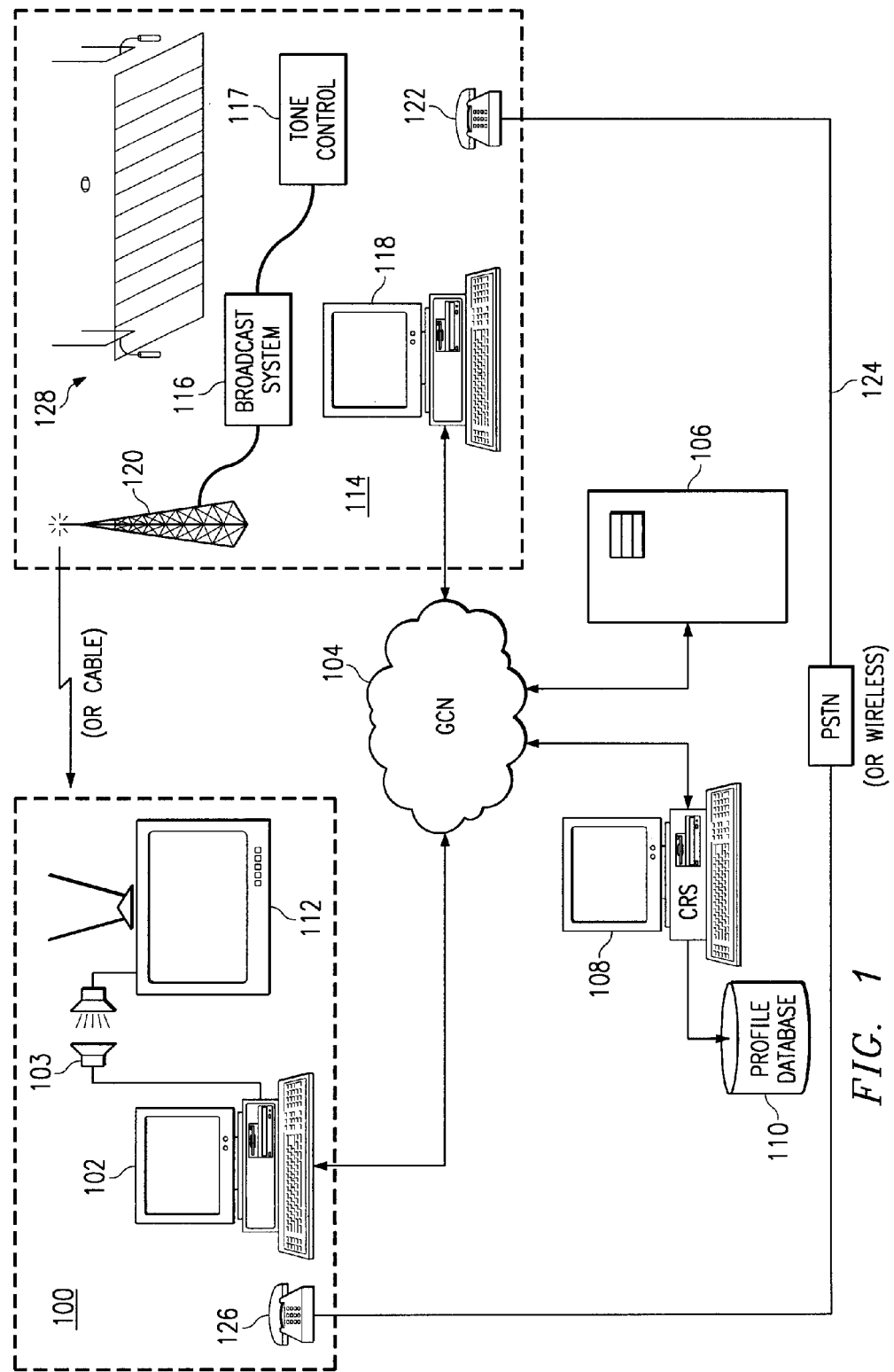
FIG. 1 illustrates a system block diagram of the product promotion architecture, according to a disclosed embodiment.

Referring now to FIG. 1, there is illustrated a general block diagram of the product promotion architecture, according to a disclosed embodiment. In this particular embodiment, the promotion process comprises product advertising using a television network in conjunction with a global packet-switched communication network. Advertising during a stated event covered by the television network is also provided using the packet-switched network. The viewer is encouraged to view both the television and a computer by the inducement of winning a prize. Therefore, the advertiser who broadcasts advertisements during the event benefits by having at least two avenues for presenting advertising to a viewer, and reaches a potentially larger audience by using such a system.

In implementation, a large user profile database is generated using a first product, a software package which facilitates advertising over the packet-switched network. The user profile database can then be sold to an advertiser of a second product (or class of products) for use in obtaining potential customers of the second product (e.g., a vehicle) by targeting the customers according to information provided in the user profile. The use of such a disclosed architecture can be made more refined by designing the user profile according to specific information desired by a particular advertiser willing to take advantage of such a system.

In the world of advertising, it is desirable to reach the largest number of potential customers possible given the expense and time to do so. Such exposure can best be obtained by major sporting events which are broadcast nationwide, and in many cases, worldwide, to foreign countries which can also have large numbers of potential customers. The Super Bowl™ sporting event, in this particular embodiment, will provide the mechanism by which prize winners can be selected. The Super Bowl™ is a major annual football game having a large number of viewers, and attracting advertisers paying large sums of money for the rights to advertise selected products during the game to millions of viewers. The game is viewed using conventional television signal communication techniques to transmit the sporting event to millions of viewers having conventional televisions or other means for watching the game.

In this particular embodiment, the software package will be used by the viewer at a viewer location 100 on his or her computer 102, but it can be appreciated that the software package can be utilized with any computer, whether it be at home or work. The computer 102 connects to a global packet-switched communication network (GCN) 104 to gain access to the myriad of informational servers also disposed on the GCN 104. The software has associated therewith a unique identification (ID) number with which to associate the user to a user profile. Completion of the user profile is a requirement for registration and use of the software, and a prerequisite for being eligible to play the game to win one or more prizes (e.g., $1,000,000).

The public must first be made aware of the product promotion and induced into obtaining the software package for the opportunity of winning one or more of the prizes, using any of a number of conventional methods. For example, prior to the upcoming major sports event, advertising is used to inform the public of the prizes through flyers, insertions with other products, and radio and television advertisements, to name a few. The software can be made free to the public (or sold for a nominal fee) at the discretion of the vendor, in the format of disks, preferably a compact disk (CD), which stores a large amount of information, is easy to handle, and relatively rugged to survive the varied methods of distribution to the public. Methods of distribution comprise direct mailings to the homes of many residents, supplements with popular food products such as burgers and pizzas, downloads from a software vendor server 106 disposed on the GCN 104, and free giveaways at many other popular locations frequented by the public such as movie theaters and retail stores. Operation and use of the software, and its use with compatible hardware can also be provided during the distribution process to further encourage the viewer to take part in the promotion program.

When the viewer has obtained the software package, they install the software onto the home computer 102. The software is operable to respond to a tone transmitted to a microphone 103 connected to the computer 102. The tone having encoded information therein provides information to the software package to cause a connection to a particular web site server also disposed on the GCN 104. The installation process requests the viewer to complete the user profile mentioned hereinabove. The user profile and unique product ID are then transmitted across the GCN 104 to a central registration server (CRS) 108. The CRS 108 has associated therewith a CRS database unit 110 for storing the user profiles and associated unique product IDs. The user profile of the viewer is now linked to the unique ID of the software package, and by selecting the ID, the identity of the viewer can be ascertained. It is desirable to accumulate as many user profiles as possible since the return on revenue from the sale of the profile database to one or more advertisers is based upon the number of user profiles available for purchase. In addition, this provides a larger number of users of the software package, which is also desirable.

When the day of the sporting event arrives, it is anticipated that a large number of the users having the software will then be viewing the sporting event in order to win the prize. Where in conventional methods, the viewer is enticed to stay tuned to the same channel of the sporting event through the use of entertaining commercials, the disclosed method enhances the conventional method by providing a "phrase-that-pays" during one of the commercial breaks. The phrase-that-pays is simply a short phrase which contains a brief presentation of the second product which is transmitted to the home computer 102 in response to a triggering event which occurs during the game (noting that this "phrase-that-pays" is not viewable on the user's screen in the preferred disclosed embodiment.). The second product is a product of an advertiser who has paid for the opportunity to present their product to a "captive" audience, the on-line computer users who comprise the audience of viewers waiting for the prize-winning phrase. The phrase-that-pays then becomes the key phrase that the selected potential winner must parrot back in response to a call from the prize promoters, which call is facilitated through the use of information stored in the user database at the CRS. This is an important opportunity of the advertiser of the second product in that potentially millions of on-line viewers are now attentive to its particular advertisement in hopes of personal material gain, and not simply for a brief period of entertainment from a string of television commercials, as in conventional methods of commercial advertising. It also could be that the "phrase-that-pays" is not associated with a second product, but merely used to update the users' profile and keep them at their television set.

A viewer at the viewer location 100 watches the football game using a television 112. The television 112 outputs audio signals perceptible by the viewer and also facilitates transmission of the encoded audible tone which is coupled into the computer 102 and operable to control the software package installed on the computer 102. The game is broadcast to the viewer location 100 from an event location 114 using a broadcast system 116 having conventional transmission mechanisms using, for example, and antenna system 120. Note that cable systems may also be implemented as an alternative to wireless systems to carry the information to the viewer. In this particular embodiment, the event location 114 comprises the location of the Super Bowl™. The event location 114 also has access to the GCN 104 via an event computer 118 which is used to access the profile database stored on the CRS database unit 110. The event location 114 also comprises a tone control system 117 which controls the transmission of a tone signal in response to a triggering event of the game, for example, a touchdown.

A facet of the disclosed product promotion architecture is the capability of providing a triggering event which marks when the profile database is to be accessed for information of a potential winner. In this particular embodiment which uses the Super Bowl™ football game, one triggering event is a touchdown, and another is the combination of a first touchdown of the fourth quarter. When any of the participating teams scores a touchdown, in one embodiment of the triggering action, a prize will be given away. In response to the touchdown, the tone control system 117 initiates broadcast of an encoded tone embedded in the television broadcast signal. The signal is received by the computer 102 and processed by the software package to direct the computer 102 to connect to the event computer 118 (or any computer disposed on the GCN 104). Upon accessing the web site via receipt of the encoded tone, the on-line user is presented a commercial at the computer 118 having a phrase-that-pays, which is the prize-winning information required in order to win the prize, if called upon to provide such information. The phrase-that-pays commercial incorporates a second product of an advertiser, in one disclosed embodiment, but may not in another application.

A unique ID for a randomly selected user is then selected, and the associated profile database of the CRS database unit 110 accessed from the event computer 118 via the GCN 104 to perform a matching operation with one or more profile database entries for the particular unique ID selected. The associated user profile stored therein is then accessed for the telephone number of the potential viewer, it being noted that, in one embodiment, that it is not necessary to ensure a viewer is logged on to the site, i.e., has their computer turned on and has actually received the tone and been launched on the appropriate site. The viewer is then contacted by placing a telephone call from the event location 114 using a event handset 122, over a PSTN 124 (public-switched telephone network) to a viewer handset 126 of the viewer location 100. If the viewer answers the call, he or she is asked for the phrase-that-pays. If the called viewer replies with the correct phrase, they are instant winners of the prize. Alternatively, an incorrect reply results in another unique product ID being selected and matched to a second potential winner and a call made. The process continues until a winner is determined for the particular touchdown made. Note that in order to expedite the selection process during a commercial break, several potential winners could be called in parallel. For example, five unique product ID numbers could be selected and then associated potential viewers called in parallel. The called viewers would then be queried for the phrase-that-pays in the order in which the unique numbers were originally selected. This method of parallel calling also provides excitement to the viewer in that they know that they at least had a chance for winning, and would provide an incentive to continue playing the game the next it is offered.

The selection process occurs "behind the scenes" such that viewers are not subjected to the selection process, but can watch other commercials while the winner is being determined. Note that this process could also be presented "live" to the viewing audience, at the discretion of the broadcast network and advertisers. As sporting events typically use a video playback feature to replay notable events for the viewing audience during the game, this playback feature using audio-only can be implemented such that the viewing audience can experience the reaction of the prize-winning viewer when the prize is awarded. This audio-playback also offers the associated advertiser of the second product, whose product is associated with the phrase-that-pays, another advertising slot with which to promote its product with a winning motif. Note that where connections permit, as possibly indicated in the user profile, the announcement of the prize to the viewer could be made over the GCN 104 using one or more commonly recognized high-speed connection technologies, such as Digital Subscriber Line (DSL) and cable modems. Using these technologies, the viewer at the viewer location 100 may be contacted via the viewer computer 102 using streaming video such that a real-time video connection of the viewer may be displayed during the playback of the award announcement, as opposed to the audio-only process mentioned hereinabove when using the PSTN 124. Alternatively, as mentioned hereinabove, a viewer having this type of high-speed connection could also be viewed live by the viewing audience during the award announcement, providing a more attractive method for exposing the viewing audience to additional advertising. The viewer computer 102 having a video camera (not shown) attached thereto and operable to capture the image of the viewer for display to all television viewers during the award announcement, also provides a viable alternative. The process continues with a winner being announced for every touchdown scored during the Super Bowl™ game.

Another facet of the disclosed promotional program is the award of a prize to one of the individuals attending the game at a stadium 128 at the event location 114. For example, in the fourth quarter, in addition to one or more members of the television viewing audience becoming prize winners, the first winner from the television viewing audience of a prize made in response to the first touchdown of the fourth quarter is asked to choose from a set of numbers which identify a specific seat in the stadium 128. The person in attendance at the game who is assigned to that seat then is also made an instant winner of a prize. Naturally, variations of the disclosed promotion exist to provide more or fewer prizes triggered on events other that touchdowns and for prizes other than cash.

Still another facet of the disclosed promotional program is that the number of viewers can be a known parameter. Conventional push technologies advertise to a large audience without having a good mechanism for more precisely determining the size of the viewing audience. Random polls are taken and extrapolated across a larger populace to estimate the size of the viewing audience. In the disclosed embodiment, since the viewers have purchased and registered the software package at the CRS 108, the software is operable to provide information as to which of the registered users are currently on-line and logged in to the associated game site. Therefore, the total number of on-line viewers can be determined, and the advertisers can be charged in a more precise manner when advertising is presented on the viewers computer 102. Furthermore, the tone signal can be transmitted not only on the basis of a touchdown being made, but for other purposes during the game. Again, the number of on-line viewers is more precisely known such that the return and costs of advertising presented as a result of the transmitted tone signal can be more accurately ascertained and charged accordingly.

Note that other contact information could also be used, for example, an email address could be used to contact the winner, although the latency in time from the moment of selection of the potential winner to award of the prize may diffuse the excitement associated with a more immediate result of a live presentation of the prize. Similarly, an IP (Internet Protocol) address could be used where the viewer has stipulated such a static address (one that is permanently assigned to that user) in the user profile information.

Referring now to FIG. 2, there is illustrated a flowchart of the process of promoting a product, according to a disclosed embodiment. Again, the discussion will focus on a software package as the promoted product, but it can be appreciated that the promoted product can also be non-software items. Flow begins at a Start block and proceeds to a function block 200 where the public is made aware of the product promotional program. This may be accomplished by any number of communication means, for example, radio, television, newspaper advertisements, etc., which offers a prize for installing and using the software package. Flow is then to a function block 202 where the product is made available for distribution by conventional means, for example, the product may be distributed freely to customers through the U.S. Mail, through free handouts at retail stores which large numbers of potential customers normally frequent, and as mentioned hereinabove, in the more recent past, the software packages have been offered to a consumer who has connected on-line to the GCN 102 to various vendor download servers 106 disposed thereon, and downloaded the software therefrom.

Flow is then to a function block 204 where the potential customer installs the product when the product is required to be installed for operation. For this discussion, the potential customer installs the software page on their computer 102. However, the software may also be utilized at work and loaded on such work computers. Note that the product need not be that which requires installation, but simply exists, but eligibility for winning the prize requires on-line registration, and connection to one or more selected web site during the game. Optionally, the install process of function block 204 can be bypassed, as indicated in a path 206, such that flow proceeds directly to a function block 208 where the user registers the product at the CRS 108 disposed on the GCN 104. The primary intent with these items, function block 204, the bypass path 206, and function block 208 are to indicate that the user has to, in this particular embodiment, register the product with the vendor of the product. Registration is accomplished more conveniently by connecting on-line to the CRS 108 and providing the necessary information to complete the registration process. Alternatively, the registration process can be accomplished by telephone to an agent who takes the necessary information from the user of the software, or by mail, where the user completes a paper form and mails the form to the vendor. As will be mentioned hereinbelow, the purpose of this is to obtain user profile information of the user which then becomes a product for sale or distribution to an advertiser at a later point in time of the promotional program. Therefore, in any case, whether the product is to be installed or not installed, the user registers the product such that the both the user profile information and unique product ID are stored on the profile database unit 110 connected to the CRS 108.

Flow is then to a function block 210 where, as part of the registration process, the user completes the user profile having user profile information which includes a wide variety of user preferences. The particular information requested on the user profile may have been stipulated prior to the product promotion program to obtain the information desired by particular advertisers seeking this user profile information. The advertisers can then prepare more focused advertisements according to the demographics derived from the user profiles. Taking this to a next step, the advertisers can provide more individualized advertising to the viewers according to the user profile information. Therefore, in order for the user to gain any benefits related to the product and the prize, the user must complete the user profile information and transmit it to the registration server in order to be eligible for the prize offered by the product promotion program. Flow is then to a function block 212 where the user transmits the user profile information and a product ID to the central registration server 108 having the profile database attached thereto. Therefore, upon transmitting the user profile information to the central registration profile database, the user also transmits the product ID wherein the product ID and user profile become linked in the profile database of the CRS 108.

Flow is then to a function block 214 where a game (e.g., the Super Bowl™) is operated in order to facilitate selection of potential winning viewers of the software package. Note that the game may be as basic as a drawing where the unique ID is randomly selected in order to obtain a potential winner of the prize. After the game is initiated, as indicated in function block 214, flow moves to a decision block 216 to determine if the game is over. If the game is not over, flow is out the "N" path to a function block 218 to continue broadcasting the game to the viewers. Typically, the timing of the broadcast will be linked to a major event such that the advertiser takes advantage of the largest number of viewers to gain the most exposure of its product for its advertising dollar. Advertisers pay a sizeable sum for advertising during the Super Bowl™ simply because the viewership of that event is so enormous and, therefore, the advertisers have the greatest potential of reaching the most viewers with their product information.

Flow is then to a decision block 220 to determine if a triggering event has occurred. In the context of the football game of this particular embodiment, the triggering event is a touchdown wherein each time a touchdown is made, a drawing is held in which a unique product ID is selected and matched against the central registration server 108 database to obtain the identity of a customer (user, viewer, etc). The user profile associated with the selected ID(s) is then accessed to obtain information for contacting the associated customer/user who has the potential for becoming the winner of the prize. Typically, this method of contact will be by telephone over the PSTN 124 such that the customer can be interviewed live during the broadcast of the sporting event.

Note that other means of communication may be used such that the customer can be contacted. For example, with the current technological advances in communications using computers, it is conceivable that the customer could be contacted and interviewed via their home computer 102 over the GCN 104. Another method of communication uses wireless communication such as cellular telephones.

If the triggering event has occurred, flow is from the "Y" path of decision block 220 to a function block 222 where the encoded tone signal is initiated from the tone control system 117 at the event location 114 into the broadcast system 116. The viewer at the viewer location 100 hears the encoded tone signal in conjunction with an animated icon on the screen of their television 112. The audible encoded tone is coupled to the computer 102 using the microphone 103 where it is processed by the software package. Flow is then to a function block 223 where the software package then directs the computer 102 to connect to one of one or more web servers (not shown) which then returns information to the computer 102 and display the phrase-that-pays to the viewer. It is conceivable that the CRS 108 could provide this function, as well as the download server 106. In any case, the on-line viewer is connected to a server disposed on the GCN 104 to obtain the phrase-that-pays. The phrase-that-pays incorporates a product advertisement of the second product.

Flow is then to a function block 224 where the product ID is selected at random. Upon drawing the unique product ID, the central registration server database is referenced by the event computer 118 using the product ID in order to obtain the associated user profile. Flow is then to a function block 226 where the product ID is matched with the profile database stored on the profile database unit 110 to obtain the profile information and the user associated with that particular product ID. That user is then contacted by any variety of communication means as indicated hereinabove. Flow is then to a decision block 228 to determine if the user has responded to the attempt to contact them. If not, flow is out the "N" path of decision block 228 back to the input of function block 224 to select another product ID and hence, another potential prize winner. Note, that the promotion program could also be configured to automatically award the prize to the user associated with the selected unique product ID without requiring a successful contact of the on-line viewer.

If the customer associated with the product ID is available, i.e., answer the phone, flow is out the "Y" path of decision block 228 to a function block 230 where the customer is then prompted for the particular product advertisement (phrase-that-pays) provided prior to the selection process. As mentioned hereinabove, the customer must provide the phrase-that-pays in reply to a prompt for that phrase. In that this is in the context of advertising, it is desired that the viewing public know that a winner was awarded the prize (and optionally, the identity of the winner), that the prize was awarded on the basis of using the software package (or product), and the association of being a winner when using the second product incorporated into the phrase-that-pays. The phrase-that-pays may be simply a catchy phrase having the second product as part of the phrase, or may be pictures or any other information which the customer may be required to respond with. Flow then is to a decision block 232 to determine if the response provided by the customer is correct. If not, flow is from the "N" path back to the input of function block 224 to select another product ID and hence, another potential winning customer. If so, flow is from the "Y" path to a function block 234 where the prize is awarded to the winner. In this example, awarding of the prize is simply notifying the customer that he or she has correctly responded to the question and been advised that he or she has won the prize.

It can be appreciated that this award event would be recorded for playback to the viewing audience of the Super Bowl™ sporting event such that the advertiser can obtain additional advertising related to the prize being awarded. Therefore, flow moves to a function block 236 where broadcast of the prize being awarded to the customer is played back to the viewing audience. Flow then moves out of function block 236 to the input of function block 214 where the game continues to be operated in order to obtain another prize winner, if the game is deemed not to be over. If the game is over, flow is from the "Y" path of decision block 216 to a function block 238 where the advertiser is charged according to the number of on-line viewers present during advertising of is products.

Alternatively, the database profile information may be provided to one or more of the advertisers who paid rights to advertise during the game. The user profile information is one incentive that induces the advertiser to expend large amounts of prize money since the user profile information provides important information to the advertiser to as to how to reach the customer with its products or to sell more products. As mentioned hereinabove, another incentive for the advertiser is knowing that a determinable number of viewers are present watching the advertisements, and that the advertisements may be doubled up by broadcasting on the television and the on-line packet-switched network, with the on-line advertising at a greatly reduced cost, if any cost at all to the advertiser. Also know that flow is out the "N" path of decision block 220 when a triggering event has not occurred during the game such that flow moves back to the input of function block 214 to continue to operate the game until a triggering event has occurred.

As indicated in the discussion of FIG. 1, in the context of this disclosed embodiment, the fourth quarter of the Super Bowl™ triggers additional prize winners. The first touchdown of the fourth quarter triggers not only a winner among the television viewing audience, but also a winner who is in attendance at the game. First, the winner of the television viewing audience will be selected. Then that winner will be asked to select from three sets of numbers, which numbers identify a seat in the stadium of the sporting event. The game attendee who has that seat number also becomes an instant winner.

It can be appreciated that the viewer, as a member of the television viewing audience, can have their home computer 102 connected on-line during the sporting event to a web site associated with the sporting event. The broadcast network at the event location 114 can then send game information and/or product advertisements to the computer 102 of the viewer during the game. Naturally, if the viewer has only a single telephone connection in which to make the on-line connection, the viewer will be required to disconnect their home computer from the GCN 104 in order to free-up the telephone line for the incoming call from the broadcaster. In this instance, the viewer can be notified via e-mail that they are about to be telephoned, and must disconnect the computer 102. Alternatively, the broadcaster, using the event computer 118 can identify the potential winner using the user profile, and post a general notice on the broadcaster web site, that the user associated with that particular unique ID is about to receive a telephone call, and to take appropriate measures to receive the call.

There is provided a promoter 302 which is interfaced with an event 304. The event, as described hereinabove, can be such an event as a football game wherein a triggering action may be a touchdown in the football game. The promoter 302 is interfaced with the event 304 in that the promoter can view the event 304. The promoter 302 could be an integral part of the event 304.

The event 304 is interfaced with a plurality of users 306 through a broadcast channel 308. This is in an embodiment wherein a television is used to transmit the event. However, any manner of interfacing event with a plurality of users in the broadcast mode or even in a dedicated mode is anticipated by the present disclosure.

It is only important that all the information be transmitted to the users 306, such that each user 306 can individually receive information regarding the event during the event 304.

Figure 3:
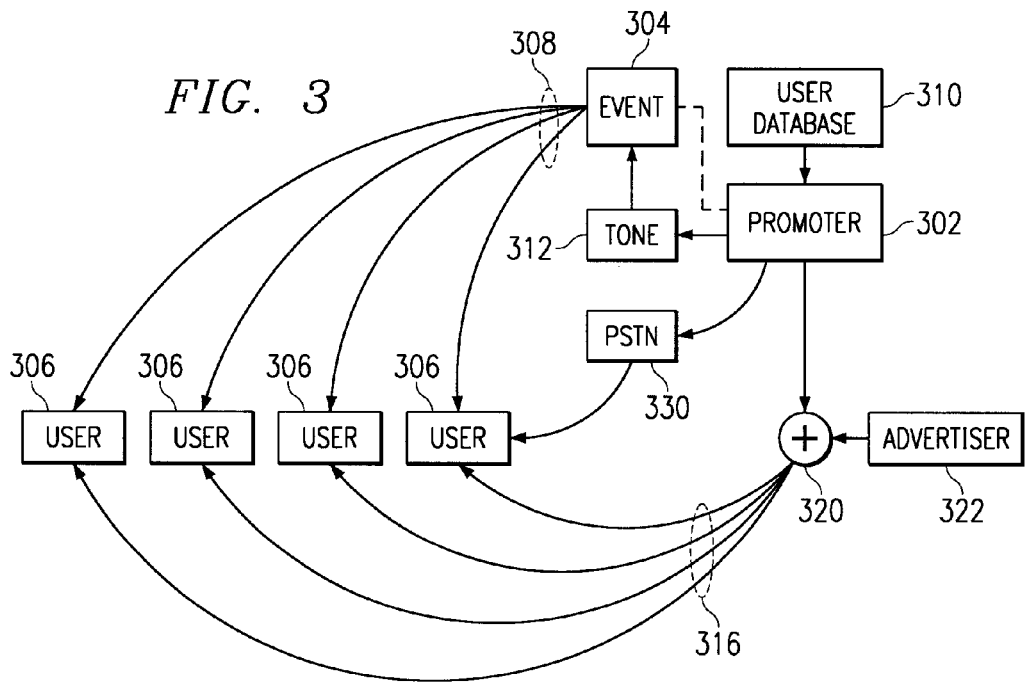
FIG. 3 illustrates a diagrammatic view of the overall operation of the promotional program.

The promoter 302 also has access to a user database 310, which user database 310 has associated therewith information about all of the potential users that may be interfaced with the event 304, it being noted that a "user" is defined as an individual that is disposed in the user database 310 and is accessible through the global communication network. Upon a triggering action occurring during the event 304, the promoter 302 will activate a tone 312, which tone will be summed with the broadcast signals and sent to all of the users, it being noted that it will be sent to non-users also. The users 306 are illustrated as only those users in user database 310 that are actually viewing the event 304. Upon transmission of the tone, each of the users 306 that are actually viewing the event such that their computers are interfaced with the event 304 and the broadcast on channels 308 to receive the tone will make a connection with the promoter 302 through a network connection 316. This network connection 316 is that associated with the global communication network, as described hereinabove. The. promoter, almost simultaneously dealing with activation of the tone 312, will transmit information to the users 306 via the network communication in addition to potentially summing at a summing junction 320, information of an advertiser 322. The advertiser information may just be information on a web page. However, there is provided by the promoter 302 some indicia that is not disposed in the event 304 such that non-users viewing the event will be denied access to this unique information, which in one disclosed embodiment is a unique phrase. Simultaneously with transmitting this unique phrase or unique information, the promoter then accesses the user database 310 and randomly calls any potential user that is disposed within the user database 310. It is noted that the users 306 do not represent all of the users in the user database and, therefore, a number of phone calls based upon user profile information in the user database 310, will either not answer or be unaware of this unique phrase or unique information transmitted to the users 306. The reason for this is that, without receipt of the unique tone, any potential user of the system that would have their computer on, would not be able to access the promoter's location and effect a communication link therewith. This is due to the face that the unique encoded information within the tone 312 is required in order to determine the location of the promoter 302 on the network. Once the promoter has activated the tone in response to the triggering occurrence, i.e., the touchdown, the promoter will send the phrase-that-pays through the network and then initiate calls through a PSTN 330 to one of the users 306. Of course, although illustrated as being to one of the users 306 connected to the event 304, it should be understood that calls are made to individuals that are in the user database 310, but are not connected users, it being understood that the users 306 illustrated in FIG. 3 are connected users. Therefore, the promoter 302 may have to go through a large number of unconnected users to access a connected user. Additionally, it may be that the users' computer is connected, i.e., can receive the tone and connect the promoter 302 through the network, but is not actually present to answer the phone or the phone connection cannot be made. It could be that the user is in a different room viewing another TV. However, if the user is proximate to a computer and viewing the screen to see the unique phrase or information, then that user can respond to the phone call with a positive response, thus constituting that user as a winner.

Figure 4:
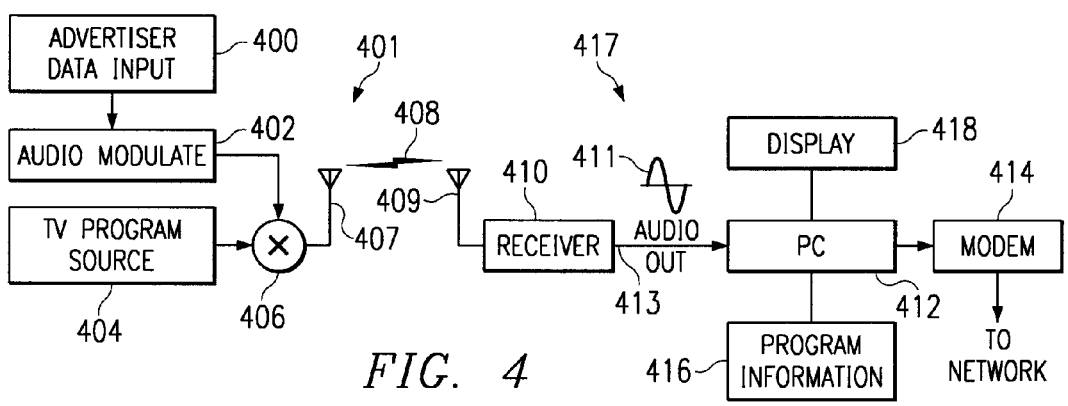
FIG. 4 illustrates a block diagram of the preferred embodiment.

Referring now to FIG. 4, there is illustrated a general block diagram of a system for controlling a personal computer ("PC") 412 via an audio tone transmitted over a wireless system utilizing a TV. In the embodiment illustrated in FIG. 4, there is provided a transmission station 401 and a receive station 417 that are connected via a communication link 408. The transmission station 401 is comprised of a television program source 404, which is operable to generate a program in the form of a broadcast signal comprised of video and audio. This is transmitted via conventional techniques along channels in the appropriate frequencies. The program source is input to a mixing device 406, which mixing device is operable to mix in an audio signal. This audio signal is derived from an audio source 400 which comprises a coded audio signal which is then modulated onto a carrier which is combined with the television program source 404. This signal combining can be done at the audio level, or it can even be done at the RF level in the form of a different carrier. However, the preferred method is to merely sum the audio signal from the modulator 402 into the audio channel of the program that is generated by the television program source 404. The output thereof is provided from the mixing device 406 in the form of broadcast signal to an antenna 407, which transmits the information over the communication link 408 to an antenna 409 on the receive side.

On the receive side of the system, a conventional receiver 410, such as a television is provided. This television provides a speaker output which provides the user with an audible signal. This is typically associated with the program. However, the receiver 410 in the disclosed embodiment, also provides an audio output jack, this being the type RCA jack. This jack is utilized to provide an audio output signal on a line 413 which is represented by an audio signal 411. This line 413 provides all of the audio that is received over the communication link 408 to the PC 412 in the audio input port on the PC 412. However, it should be understood that, although a direct connection is illustrated from the receiver 410 to the PC 412, there actually could be a microphone pickup at the PC 412 which could pick the audio signal up. In the disclosed embodiment the audio signal generated by the advertiser data input device 400 is audible to the human ear and, therefore, can be heard by the user. Therefore, no special filters are needed to provide this audio to the PC 412.

The PC 412 is operable to run programs thereon which typically are stored in a program file area 416. These programs can be any type of programs such as word processing programs, application programs, etc. In the disclosed embodiment, the program that is utilized in the system is what is referred to as a "browser." The PC 412 runs a browser program to facilitate the access of information on the network, for example, a global communication network known as the "Internet" or the WorldWide-Web ("Web"). The browser is a hypertext-linked application used for accessing information. Hypertext is a term used to describe a particular organization of information within a data processing system, and its presentation to a user. It exploits the computer's ability to link together information from a wide variety of sources to provide the user with the ability to explore a particular topic. The traditional style of presentation used in books employs an organization of the information which is imposed upon it by limitations of the medium, namely fixed sized, sequential paper pages. Hypertext systems, however, use a large number of units of text or other types of data such as image information, graphical information, video information, or sound information, which can vary in size. A collection of such units of information is termed a hypertext document, or where the hypertext documents employ information other than text, hypermedia documents. Multimedia communications may use the Hypertext Transfer Protocol ("HTTP"), and files or formatted data may use the Hypertext Markup Language ("HTML"). This formatting language provides for a mingling of text, graphics, sound, video, and hypertext links by "tagging" a text document using HTML. Data encoded using HTML is often referred to as an "HTML document," an "HTML page," or a "home page." These documents and other Internet resources may be accessed across the network by means of a network addressing scheme which uses a locator referred to as a Uniform Resource Locator ("URL"), for example, "http://www.digital.com."

The Internet is one of the most utilized networks for interconnecting distributed computer systems and allows users of these computer systems to exchange data all over the world. Connected to the Internet are many private networks, for example, corporate or commercial networks. Standard protocols, such as the Transport Control Protocol ("TCP") and the Internet Protocol ("IP") provide a convenient method for communicating across these diverse networks. These protocols dictate how data are formatted and communicated. As a characteristic of the Internet, the protocols are layered in an IP stack. At higher levels of the IP stack, such as the application layer (where HTTP is employed), the user information is more readily visible, while at lower levels, such as the network level (where TCP/IP are used), the data can merely be observed as packets or a stream of rapidly moving digital signals. Superimposed on the Internet is a standard protocol interface for accessing Web resources, such as servers, files, Web pages, mail messages, and the like. One way that Web resources can be accessed is by browsers made by Netscape® and Microsoft Internet Explorer®.

Referring again now to FIG. 4, the user can load this program with the appropriate keystrokes such that a browser window will be displayed on a display 418. In one embodiment, the user can run the browser program on the PC 412 such that the browser window is displayed on the display 418. While watching a preferred program, the user can also view display 418. When an audio signal is received by the receiver 410 and the encoded information is contained therein that was input thereto by the advertiser, the PC 412 will then perform a number of operations. The first operation, according to the disclosed embodiment, is to extract the audio information within the received audio signal in the form of digital data, and then transmit this digital data to a defined location on the global communication network via a modem connection 414. This connection will be described hereinbelow. This information will be relayed to a proprietary location and the instructions sent back to the PC 412 as to the location of the advertiser associated with the code, and the PC 412 will then effect a communication link to that location such that the user can view on the display 418 information that the advertiser, by the fact of putting the tone onto the broadcast channel, desires the viewer to view. This information can be in the form of interactive programs, data files, etc. In one example, when an advertisement appears on the television, the tone can be generated and then additional data displayed on the display 418. Additionally, a streaming video program could be played on the PC received over the network, which streaming video program is actually longer than the advertising segment on the broadcast. Another example would be a sports game that would broadcast the tone in order to allow a user access to information that is not available over the broadcast network, such as additional statistics associated with the sports program, etc.

By utilizing the system described herein with respect to the disclosed embodiment of FIG. 4, the promoter or an advertiser is allowed the ability to control a user's PC 412 through the use of tones embedded within a program audio signal. As will be described hereinbelow, the disclosed embodiment utilizes particular routing information stored in the PC 412 which allows the encoded information in the received audio signal to route this information to a desired location on the network and then allow other routing information to be returned to the PC 412 for control thereof to route the PC 412 to the appropriate location associated with that code.

Figure 5:
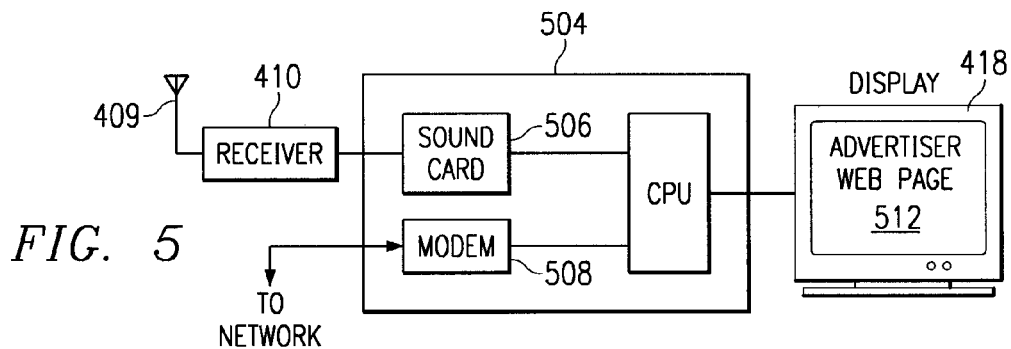
FIG. 5 illustrates the computer components employed in this embodiment.

Referring now to FIG. 5, there is illustrated a computer 504, similar to computer 412, connected to display information on display 418. The computer 504 comprises an internal audio or "sound" card 506 for receiving the transmitted audio signal through receive antenna 409 and receiver 410. The sound card 506 typically contains analog-to-digital circuitry for converting the analog audio signal into a digital signal. The digital signal may then be more easily manipulated by software programs. The receiver 410 separates the audio signal from the video signal. A special trigger signal located within the transmitted advertiser audio signal triggers proprietary software running on the computer 504 which launches a communication application, in this particular embodiment, the web browser application located on the PC 504. Coded advertiser information contained within the audio signal is then extracted and appended with the address of a proprietary server located on the communication network. The remote server address is in the form of a URL. This appended data, in addition to other control codes, is inserted directly into the web browser application for automatic routing to the communication network. The web browser running on PC 504, and communicating to the network through an internal modem 508, in this embodiment, transmits the advertiser information to the remote server. The remote server cross-references the advertiser product information to the address of the advertiser server located on the network. The address of the advertiser server is routed back through the PC 504 web browser to the advertiser server. The advertiser product information is returned to PC 504 to be presented to the viewer on display 418. In this particular embodiment, the particular advertiser product information displayed is contained within the advertiser's web page 512. As mentioned above, the audio signal is audible to the human ear. Therefore the audio signal, as emitted from the TV speakers, may be input to the sound card 506 via a microphone. Furthermore, the audio signal need not be a real-time broadcast, but may be on video tapes, CDs, DVD, or other media which may be displayed at a later date. With the imminent implementation of high definition digital television, the audio signal output from the TV may also be digital. Therefore, direct input into a sound card for A/D purposes may not be necessary, but alternative interfacing techniques to accommodate digital-to-digital signal formats would apply.

Figure 6:
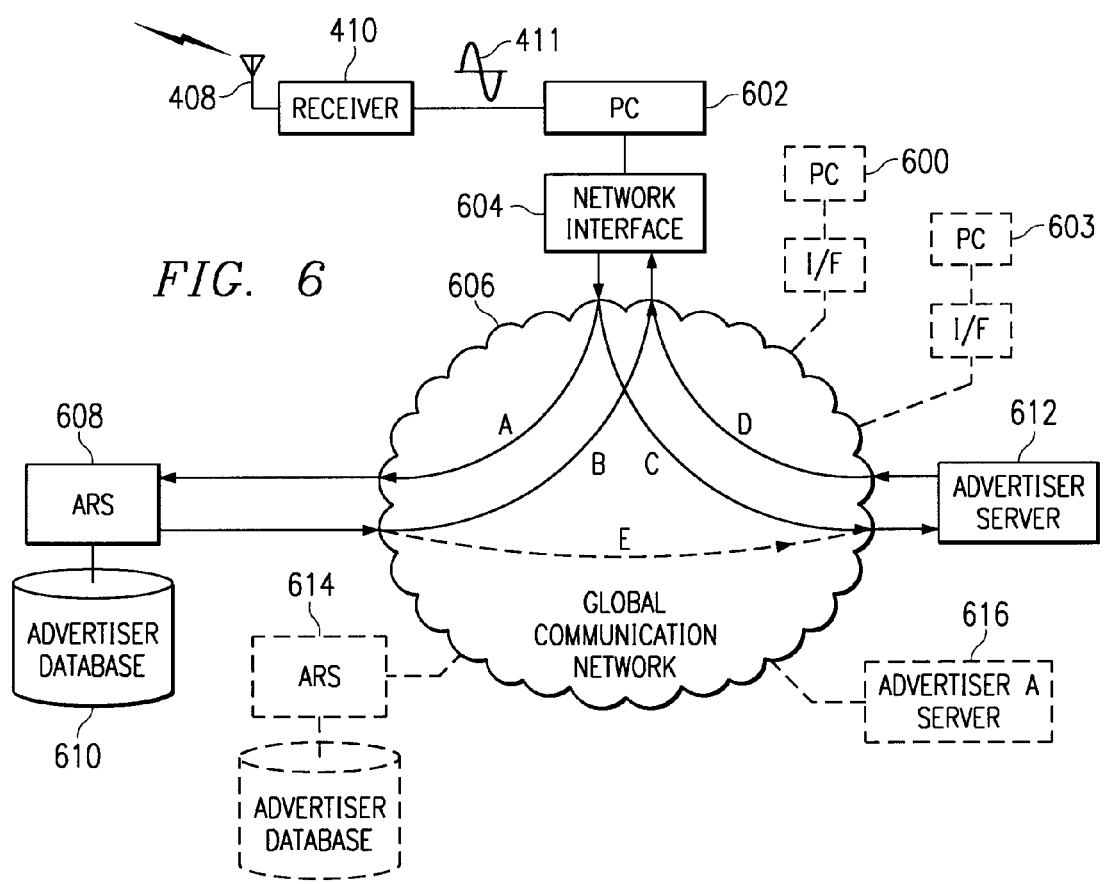
FIG. 6 illustrates system interactions over a global network.

Referring now to FIG. 6, there is illustrated a source PC 602, similar to PCs 504 and 412, connected to a global communication network (GCN) through an interface 604. In this embodiment, the audio signal 411 is received by PC 602 through its sound card 506. The audio signal 411 comprises a trigger signal which triggers proprietary software into launching a web browser application residing on the PC 602. The audio signal 411 also comprises advertiser product information which is extracted and appended with URL information of an Advertiser Reference Server ("ARS") 608, which is the same as the CRS described hereinabove. The ARS 608 is a system disposed on the GNC 606 that is defined as the location to which data in the audio signal 411 is to be routed. As such, data in the audio signal 411 will always be routed to the ARS 608, since a URL is unique on the GCN 606. Connected to the ARS 608 is a database 610 of product codes and associated manufacturer URLs. The database 610 undergoes a continual update process which is transparent to the user. As companies sign-on, e.g., subscribe, to this technology, manufacturer and product information is added to the database 610 without interrupting operation of the source PC 602 with frequent updates. When the advertiser server address URL is obtained from the ARS database 610, it and the request for the particular advertiser product information are automatically routed back through the web browser on PC 602, over to the respective advertiser server for retrieval of the advertiser product information to the PC 602. Additionally although the disclosed invention discusses a global communication network, the system is also applicable to LANs, WANs, and peer-to-peer network configurations.

It should be noted that the disclosed architecture is not limited to a single source PC 602, but may comprise a plurality of source PCs, e.g., PC 600 and PC 603.

Moreover, a plurality of ARS 608 systems and advertiser servers 612 may be implemented, e.g., ARS 614, and advertiser server A 616, respectively, although the above-described embodiment routes to an associated promoter's site.

The information transactions, in general, which occur between the networked systems of this embodiment, over the communication network, are the following.

The web browser running on source PC 602 transmits a message packet to the ARS 608 over Path "A." The ARS 608 decodes the message packet and performs a cross-reference function with product information extracted from the received message packet to obtain the address of an advertiser server 612. A new message packet is assembled comprising the advertiser server 612 address (promoter), and sent back to the source PC 602 over Path "B." A "handoff" operation is performed whereby the source PC 602 browser simply reroutes the information on to the advertiser server 612 over Path "C," with the appropriate source and destination address appended. The advertiser server 612 receives and decodes the message packet. The request-for-advertiser-product-information is extracted and the advertiser server 612 (the promoter in the above-described embodiment) retrieves the requested information from its database for transmission back to the source PC 602 over Path "D." The source PC 602 then processes the information, i.e., for display to the viewer. The optional Path "E" is discussed hereinbelow. It should be noted that the disclosed methods are not limited to only browser communication applications, but may accommodate, with sufficient modifications by one skilled in the art, other communication applications used to transmit information over the Internet or communication network.

Referring now to FIG. 7a, the message packet 700 sent from the source PC 602 to ARS 608 via Path "A" comprises several fields. One field comprises the URL of the ARS 608 which indicates where the message packet is to be sent. Another field comprises the advertiser product code or other information derived from the audio signal 411, and any additional overhead information required for a given transaction. The product code provides a link to the address of the advertiser server 612, located in the database 610. Yet another field comprises the network address of the source PC 602. In general, network transmissions are effected in packets of information, each packet providing a destination address, a source address, and data. These packets vary depending upon the network transmission protocol utilized for communication. Although the protocols utilized in the disclosed embodiment are of a conventional protocol suite commonly known as TCP/IP, it should be understood that any protocols providing the similar basic functions can be used, with the primary requirement that a browser can forward the routing information to the desired URL in response to keystrokes being input to a PC.

However, it should be understood that any protocol can be used, with the primary requirement that a browser can forward the product information to the desired URL in response to keystrokes being input to a PC. Within the context of this disclosure, "message packet" shall refer to and comprise the destination URL, product information, and source address, even though more than a single packet must be transmitted to effect such a transmission.

Upon receipt of the message packet 700 from source PC 602, ARS 608 processes the information in accordance with instructions embedded in the overhead information. The ARS 608 specifically will extract the product code information from the received packet 700 and, once extracted, will then decode this product code information. Once decoded, this information is then compared with data contained within the ARS advertiser database 610 to determine if there is a "hit." If there is no "hit" indicating a match, then information is returned to the browser indicating such. If there is a "hit," a packet 702 is assembled which comprises the address of the source PC 602, and information instructing the source PC 602 as to how to access, directly in a "handoff" operation, another location on the network, that of an advertiser server 612. This type of construction is relatively conventional with browsers such as Netscape® and Microsoft Internet Explorer® and, rather than displaying information from the ARS 608, the source PC 602 can then access the advertiser server 612. The ARS 608 transmits the packet 702 back to source PC 602 over Path "B." Referring now to FIG. 7b, the message packet 702 comprises the address of the source PC 602, the URL of the advertiser server 612 embedded within instructional code, and the URL of the ARS 608.

Upon receipt of the message packet 702 by the source PC 602, the message packet 702 is disassembled to obtain pertinent routing information for assembly of a new message packet 704. The web browser running on source PC 602 is now directed to obtain, over Path "C," the product information relevant to the particular advertiser server 612 location information embedded in message packet 704 or the information in the form of the phrase-that pays, which is provided once a connection is made. Referring now to FIG. 7c, the message packet 704 for this transaction comprises the URL of the advertiser server 612, the request-for-product-information data (or request for unique phrase), and the address of the source PC 602.

Upon receipt of the message packet 704 from source PC 602, advertiser server 612 disassembles the message packet 704 to obtain the request-for-product-information data or to identify the event that is being viewed. The advertiser server 612 then retrieves the particular product information from its database (the phrase in the present embodiment), and transmits it over Path "D" back to the source PC 602.

Referring now to FIG. 7d, the message packet 706 for this particular transaction comprises the address of the source PC 602, the requested information, and the URL of the advertiser server 612.

Figure 8:
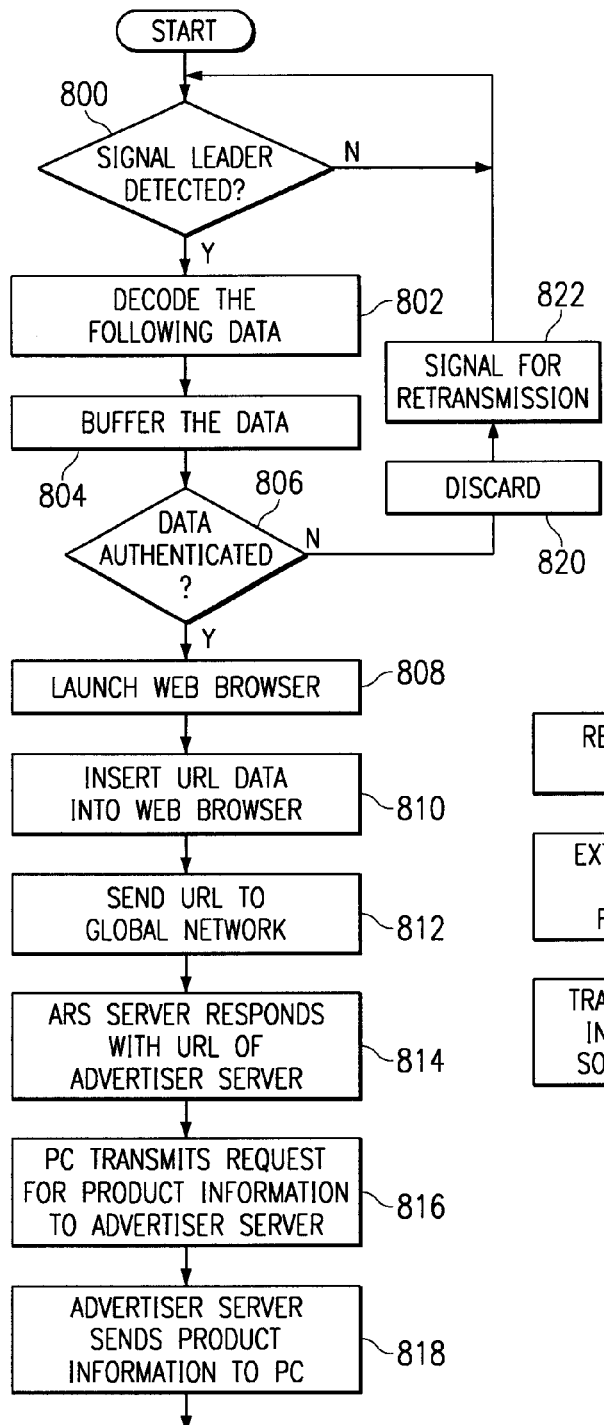
FIG. 8 is a flowchart depicting operation of the system according to the preferred embodiment.

Referring now to FIG. 8, the method for detecting and obtaining product information is as follows in the form of the unique phrase. In decision block 800, a proprietary application running resident on a source computer PC 602 (similar to PC 504) monitors the audio input for a special trigger signal. Upon detection of the trigger signal, data following the trigger signal is decoded for further processing, in function block 802. In function block 804, the data is buffered for further manipulation. In decision block 806, a determination is made as to whether the data can be properly authenticated. If not, program flow continues through the "N" signal to function block 820 where the data is discarded. In function block 822, the program then signals for a retransmission of the data. The system then waits for the next trigger signal, in decision block 800. If properly authenticated in decision block 806, program flow continues through the "Y" signal path where the data is then used to launch the web browser application, as indicated in function block 808. In function block 810, the web browser receives the URL data, which is then automatically routed through the computer modem 508 to the network interface 604 and ultimately to the network 606. In function block 814, the ARS 608 responds by returning the URL of advertiser server 612 to the PC 602. In function block 816, the web browser running on the source PC 602, receives the advertiser URL information from the ARS 608, and transmits the URL for the product file to the advertiser server 612. In block 818, the advertiser server 612 responds by sending the product information to the source PC 602 for processing.

The user may obtain the benefits of this architecture by simply downloading the proprietary software over the network. Other methods for obtaining the software are well-known; for example, by CD, diskette, or pre-loaded hard drives.

Referring now to FIG. 9, there is illustrated a flowchart of the process the ARS 608 may undergo when receiving the message packet 700 from the source PC 602. In decision block 600, the ARS 308 checks for the receipt of the message packet 700. If a message packet 700 is not received, program flow moves along the "N" path to continue waiting for the message. If the message packet 700 is received, program flow continues along path "Y" for message processing. Upon receipt of the message packet 700, in function block 902, the ARS 608 decodes the message packet 700. The product code is then extracted independently in function block 904 in preparation for matching the product code with the appropriate advertiser server address located in the database 610, i.e., the address of the promoter. In function block 906, the product code is then used with a look-up table to retrieve the advertiser server 612 URL of the respective product information contained in the audio signal data. In function block 908, the ARS 608 then assembles message packet 702 for transmission back to the source PC 602. Function block 910 indicates the process of sending the message packet 702 back to the source PC 602 over Path "B."

Figure 10:
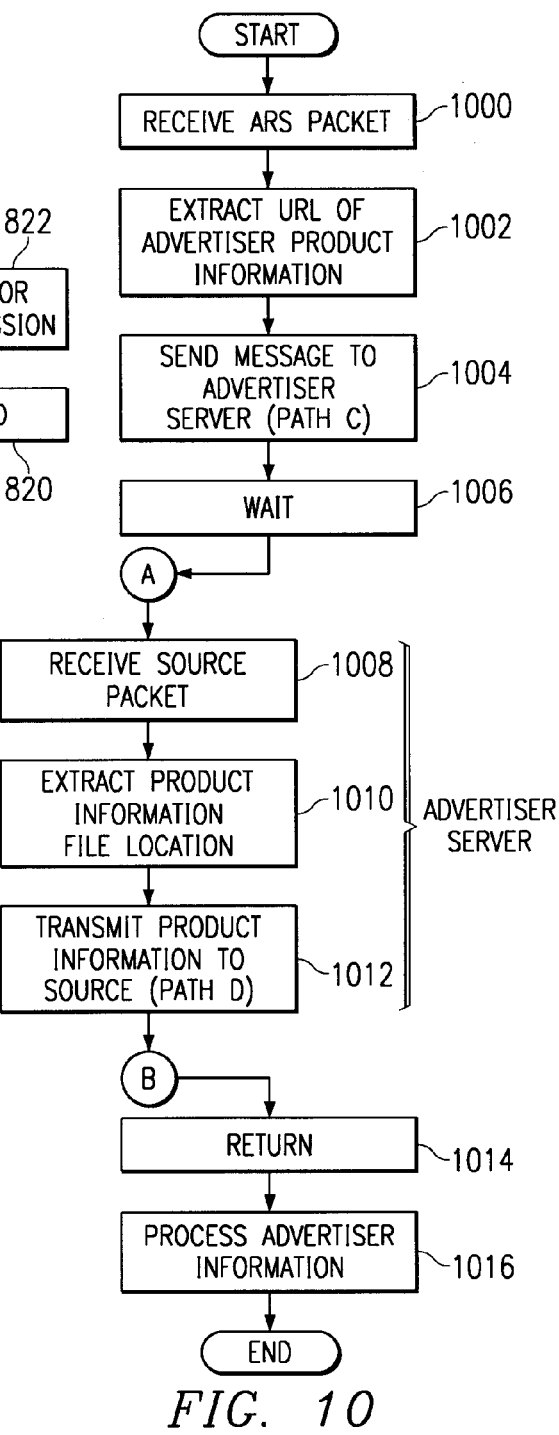
FIG. 10 illustrates a flowchart of the interactive process between the source computer and ARS.

Referring now to FIG. 10, there is illustrated a flowchart of the interactive processes between the source PC 602 and the advertiser server 612. In function block 1000, the source PC 602 receives the message packet 702 back from the ARS 608 and begins to decode the packet 702. In function block 1002, the URL of the advertiser product information is extracted from the message packet 702 and saved for insertion into the message packet 704 to the advertiser server 612. The message packet 704 is then assembled and sent by the source PC 602 over Path "C" to the advertiser server 612, in function block 1004. While the source PC 602 waits, in function block 1006, the advertiser server 612 receives the message packet 704 from the source PC 602, in function block 1008, and disassembles it. The product information location in the form of the event is then extracted from the message packet 704 in function block 1010. The particular product information in the form of the unique phrase is retrieved from the advertiser server 612 database for transmission back to the source PC 602. In function block 1012, the product information is assembled into message packet 706 and then transmitted back to the source PC 602 over Path "D" as a web page. Returning to the source PC 602 in function block 1014, the advertiser product information contained in the message packet 706 received from the advertiser server 612, is then extracted and processed in function block 1016.

Figure 11:
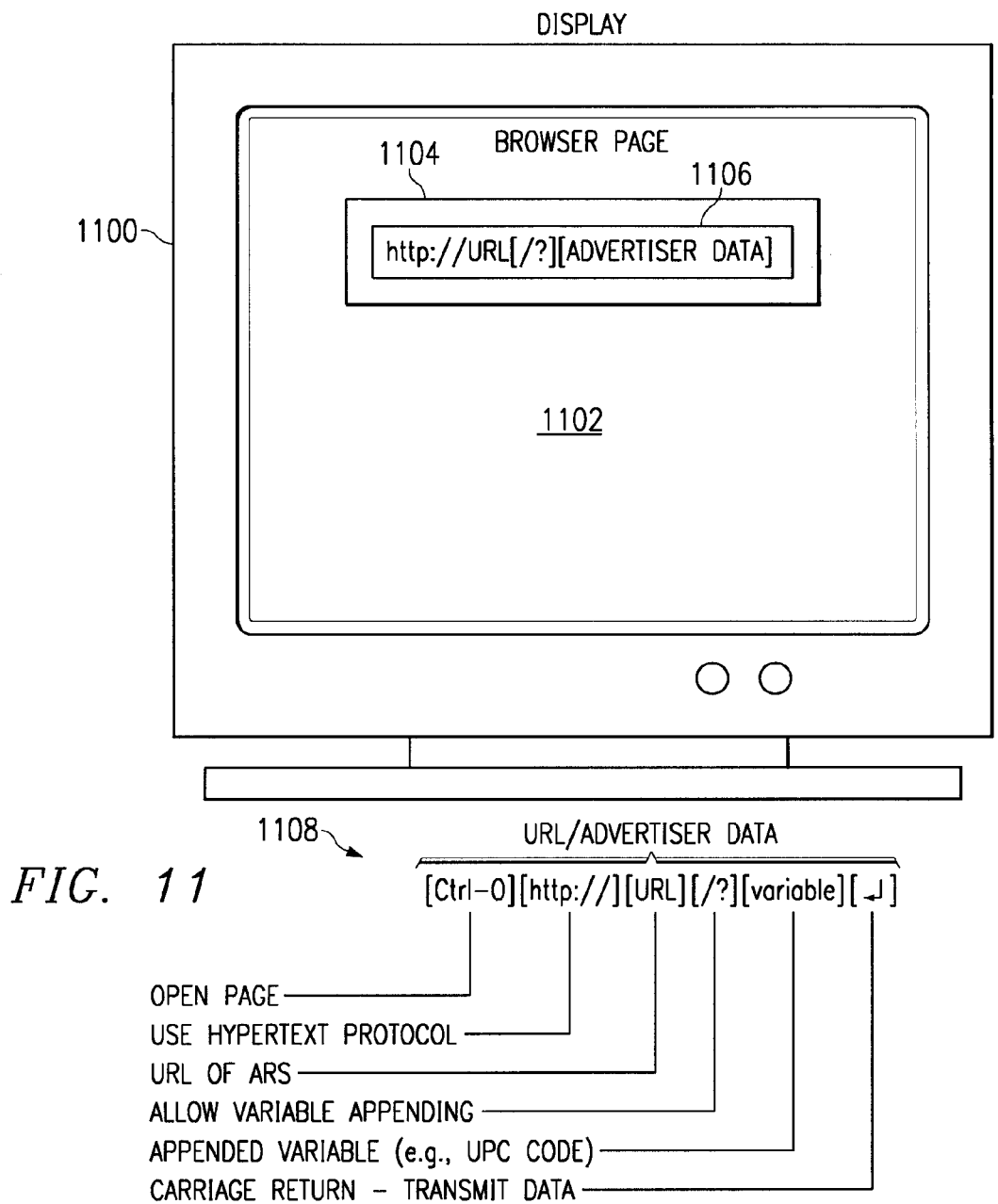
FIG. 11 illustrates a web browser page receiving the modified URL/advertiser product data according to the preferred embodiment.

Referring now to FIG. 11, after receipt of a trigger signal, a web browser application on a source PC 602 is automatically launched and computer display 1100 presents a browser page 1102. Proprietary software running on the source PC 602 processes the audio signal data after being digitized through the sound card 506. The software appropriately prepares the data for insertion directly into the web browser by extracting the product information code and appending keystroke data to this information. First, a URL page 1104 is opened in response to a Ctrl-O command added by the proprietary software as the first character string. Opening URL page 1104 automatically positions the cursor in a field 806 where additional keystroke data following the Ctrl-O command will be inserted. After URL page 1104 is opened, the hypertext protocol preamble http:// is inserted into the field 1106. Next, URL information associated with the location of the ARS 608 is inserted into field 1106. Following the ARS 608 URL data are the characters /? to allow entry of variables immediately following the /? characters. In this embodiment, the variable following is the product information code received in the audio signal. The product code information also provides the cross-reference information for obtaining the advertiser URL from the ARS database 610. Next, a carriage return is added to send the URL/product data and close the window 1104. After the message packet 700 is. transmitted to the ARS 608 from the source PC 602, transactions from the ARS 608, to the source PC 602, to the advertiser server 612, and back to the source PC 602, occur quickly and are transparent to the viewer. At this point, the next information the viewer sees is the product information which was received from the advertiser server 612.

Figure 12:
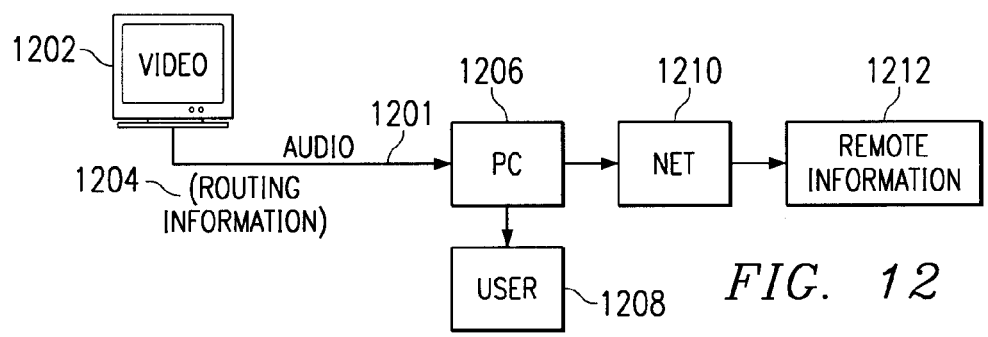
FIG. 12 illustrates a simplified block diagram of the disclosed embodiment.

Referring now to FIG. 12, there is illustrated a block diagram of a more simplified embodiment. In this embodiment, a video source 1202 is provided which is operable to provide an audio output on an audio cable 1201 which provides routing information referred to by reference numeral 1204. The routing information 1204 is basically information contained within the audio signal. This is an encoded or embedded signal. The important aspect of the routing information 1204 is that it is automatically output in realtime as a function of the broadcast of the video program received over the video source 1202. Therefore, whenever the program is being broadcast in realtime to the user 1208, the routing information 1204 will be output whenever the producer of the video desires it to be produced. It should be understood that the box 1202 representing the video source could be any type of media that will result in the routing information being output. This could be a cassette player, a DVD player, an audio cassette, a CD ROM or any such media. It is only important that this is a program that the producer develops which the user 1208 watches in a continuous or a streaming manner. Embedded within that program, at a desired point selected by the producer, the routing information 1204 is output.

The audio information is then routed to a PC 1206, which is similar to the PC 412 in FIG. 4. A user 1208 is interfaced with the PC to receive information thereof, the PC 1206 having associated therewith a display (not shown). The PC 1206 is interfaced with a network 1210, similar to the network 606 in FIG. 6.

This network 1210 has multiple nodes thereon, one of which is the PC 1206, and another of which is represented by a network node 1212 which represents remote information. The object of the present embodiment is to access remote information in the form of the unique phrase for display to the user 1208 by the act of transmitting from the video program in block 1202 the routing information 1204.

This routing information 1204 is utilized to allow the PC 1206 which has a network "browser" running thereon to "fetch" the remote information at the node 1212 over the network 1210 for display to the user 1208. This routing information. 1204 is in the form of an embedded code within the audio signal, as was described hereinabove.

Referring now to FIG. 13, there is illustrated a more detailed block diagram of the embodiment of FIG. 12. In this embodiment, the PC 1206 is split up into a couple of nodes, a first PC 1302 and a second PC 1304. The PC 1302 resides at the node associated with the user 1208, and the PC 1304 resides at another node. The PC 1304 represents the ARS 608 of FIG. 6. The PC 1304 has a database 1306 associated therewith, which is basically the advertiser database 610. Therefore, there are three nodes on the network 1210 necessary to implement the disclosed embodiment, the PC 1302, the PC 1304 and the remote information node 1212. The routing information 1204 is utilized by the PC 1302 for routing to the PC 1304 to determine the location of the remote information node 1212 on the network 1210. This is returned to the PC 1302 and a connection made directly with the remote information node 1212 and the information retrieved therefrom to the user 1208. The routing information 1204 basically constitutes primary routing information.

Referring now to FIG. 14, there is illustrated a diagrammatic view of how the network packet is formed for sending the primary routing information to the PC 1304. In general, the primary routing information occupies a single field which primary routing information is then assembled into a data packet with the secondary routing information for transfer to the network 1210. This is described hereinabove in detail.

Referring now to FIG. 15, there is illustrated an alternate embodiment to that of FIG. 12. In this embodiment, the video source 1202 has associated therewith an optical region 1502, which optical region 1502 has disposed therein an embedded video code. This embedded video code could be relatively complex or as simple as a grid of dark and white regions, each region in the grid able to have a dark color for a logic "1" or a white region for a logic "0." This will allow a digital value to be disposed within the optical region 1502. A sensor 1504 can then be provided for sensing this video code. In the example above, this would merely require an array of optical detectors, one for each region in the grid to determine whether this is a logic "1" or a logic "0" state. One of the sensed video is then output to the PC 1206 for processing thereof to determine the information contained therein, which information contained therein constitutes the primary routing information 1204. Thereafter, it is processed as described hereinabove with reference to FIG. 12.

Referring now to FIG. 16, there is illustrated a block diagram for an embodiment wherein a user's profile can be forwarded to the original subscriber or manufacturer. The PC 1206 has associated therewith a profile database 1602, which profile database 1602 is operable to store a profile of the user 1208. This profile is created when the program, after initial installation, requests profile information to be input in order to activate the program. In addition to the profile, there is also a unique ID that is provided to the user 1208 in association with the browser program that runs on the PC 1206. This is stored in a storage location represented by a block 1604. This ID 1604 is accessible by a remote location as a "cookie" which is information that is stored in the PC 1206 in an accessible location, which accessible location is actually accessible by the remote program running on a remote node.

The ARS 608, which basically constitutes the PC 1304 of FIG. 13, is operable to have associated therewith a profile database 1608, which profile database 1608 is operable to store profiles for all of the users. The profile database 1608 is a combination of the stored information in profile database 1602 for all of the PCs 1206 that are attachable to the system. This is to be distinguished from information stored in the database 610 of the ARS 608, the advertiser's database, which contains intermediate destination tables. When the routing information in the primary routing information 1204 is forwarded to the ARS 608 and extracted from the original data packet, the look-up procedure described hereinabove can then be performed to determine where this information is to be routed. The profile database 1608 is then utilized for each transaction, wherein each transaction in the form of the routing information received from the primary routing information 1204 is compared to the destination tables of database 610 to determine what manufacturer is associated therewith. The associated ID 1604 that is transmitted along with the routing information in primary routing information 1204 is then compared with the profile database 1608 to determine if a profile associated therewith is available. This information is stored in a transaction database 1610 such that, at a later time, for each routing code received in the form of the information in primary routing information 1204, there will associated therewith the IDs 1604 of each of the PCs 1206. The associated profiles in database 1608, which are stored in association with IDs 1604, can then be assembled and transmitted to a subscriber as referenced by a subscriber node 1612 on the network 1210. The ARS 608 can do this in two modes, a realtime mode or a non-realtime mode. In a realtime mode, each time a PC 1206 accesses the advertiser database 610, that user's profile information is uploaded to the subscriber node 1612. At the same time, billing information is generated for that subscriber 1612 which is stored in a billing database 1616.

Therefore, the ARS 608 has the ability to inform the subscriber 1612 of each transaction, bill for those transactions, and also provide to the subscriber 1612 profile information regarding who is accessing the particular product advertisement having associated therewith the routing information field 1204 for a particular routing code as described hereinabove. This information, once assembled, can then be transmitted to the subscriber 1612 and also be reflected in billing information and stored in the billing information database 1616.

Figure 17:
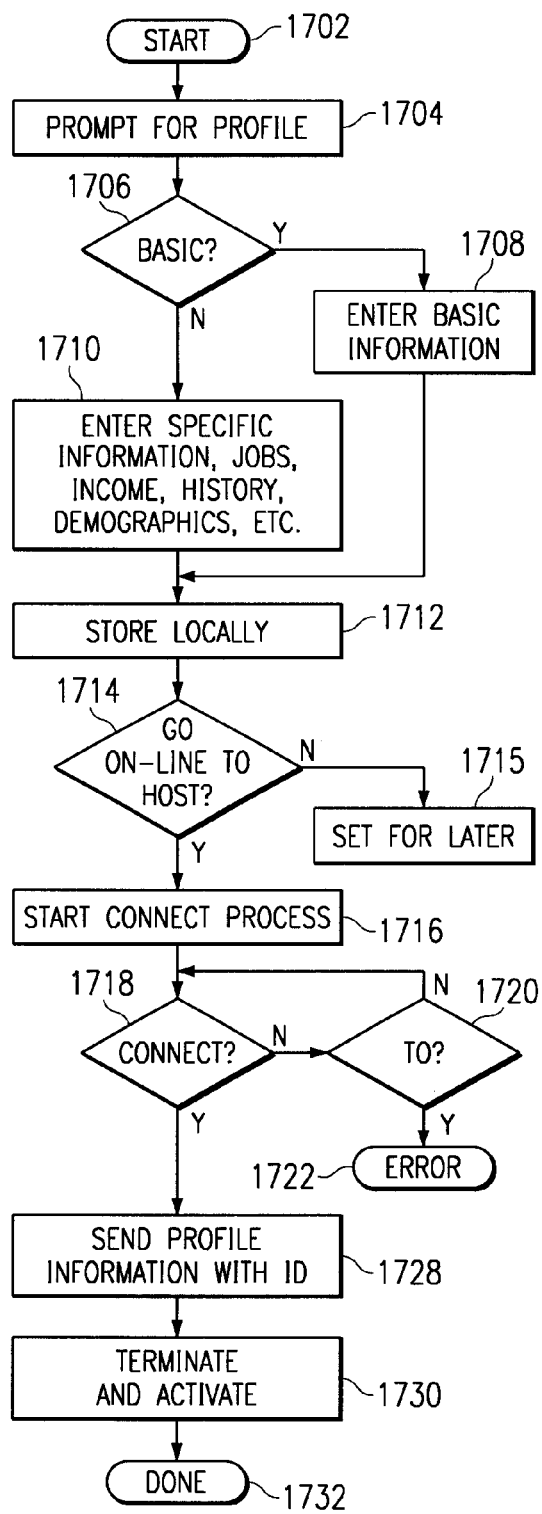
FIG. 17 illustrates a flowchart for generating the profile and storing at the ARS.

Referring now to FIG. 17, there is illustrated a flowchart depicting the operation for storing the profile for the user. The program is initiated in a block 1702 and then proceeds to a function block 1704, wherein the system will prompt for the profile upon initiation of the system. This initiation is a function that is set to activate whenever the user initially loads the software that he or she is provided. The purpose for this is to create, in addition to the setup information, a user profile. Once the user is prompted for this, then the program will flow to a decision block 1706 to determine whether the user provides basic or detailed information. This is selectable by the user. If selecting basic, the program will flow to a function block 1708 wherein the user will enter basic information such as name and serial number and possibly an address. However, to provide some incentive to the user to enter more information, the original prompt in function block 1704 would have offers for such things as coupons, discounts, etc., if the user will enter additional information. If the user selects this option, the program flows from the decision block 1706 to a function block 1710. In the function block 1710, the user is prompted to enter specific information such as job, income level, general family history, demographic information and more. There can be any amount of information collected in this particular function block.

Once all of the information is collected, in either the basic mode or the more specific mode, the program will then flow to a function block 1712 where this information is stored locally. The program then flows to a decision block 1714 to then go on-line to the host or the ARS 608. In general, the user is prompted to determine whether he or she wants to send this information to the host at the present time or to send it later. If he or she selects the "later" option, the program will flow to a function block 1715 to prompt the user at a later time to send the information. In the disclosed embodiment, the user will not be able to utilize the software until the profile information is sent to the host. Therefore, the user may have to activate this at a later time in order to connect with the host.

If the user has selected the option to upload the profile information to the host, the program will flow to the function block 1716 to initiate the connect process and then to a decision block 1718 to determine if the connection has been made. If not, the program will flow along a "N" path to decision block 1720 which will timeout to an error block 1722 or back to the input of the connect decision block 1718. The program, once connected, will then flow along a "Y" path from decision block 1718 to a function block 1728 to send the profile information with the ID of the computer or user to the host. The ID is basically, as described hereinabove, a "cookie" in the computer which is accessed by the program when transmitting to the host. The program will then flow to a function block 1730 to activate the program such that it, at later time, can operate without requiring all of the setup information. In general, all of the operation of this flowchart is performed with a "wizard" which steps the user through the setup process. Once complete, the program will flow to a Done block 1732.

Figure 18:
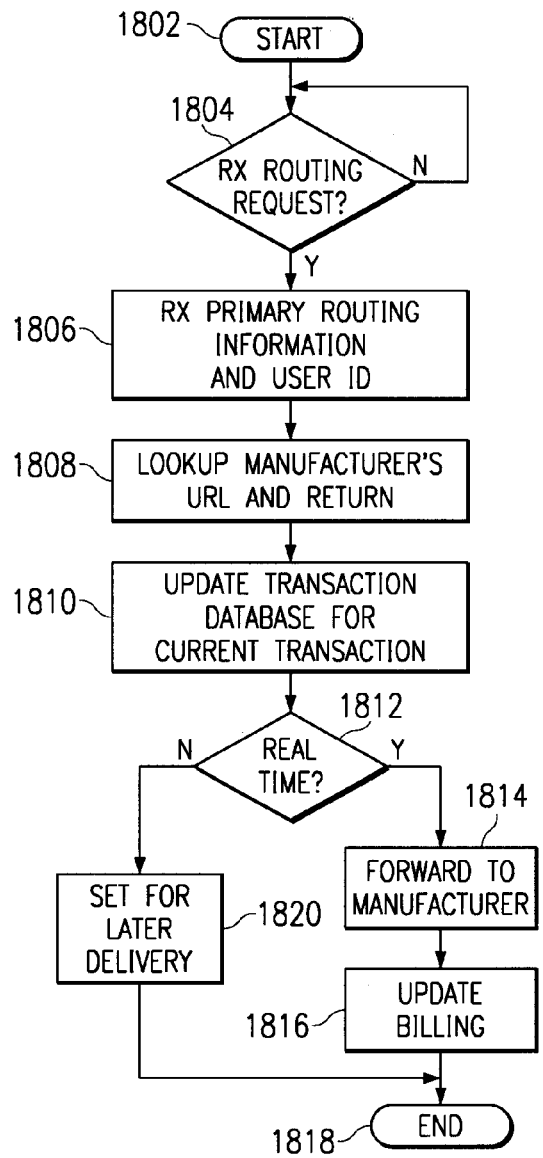
FIG. 18 illustrates a flowchart for processing the profile information when information is routed to a user.

Referring now to FIG. 18, there is illustrated a flowchart depicting the operation of the host when receiving a transaction. The program is initiated at a Start block 1802 and then proceeds to decision block 1804, wherein it is determined whether the system has received a routing request, i.e., the routing information 1204 in the form of a tone, etc., embedded in the audio signal as described hereinabove with respect to FIG. 12. The program will loop back around to the input of decision block 1804 until the routing request has been received. At this time, the program will flow along the "Y" path to a function block 1806 to receive the primary routing information and the user ID. Essentially, this primary routing information is extracted from the audio tone, in addition to the user ID. The program then flows to a function block 1808 to look up the manufacturer URL that corresponds to the received primary routing information and then return the necessary command information to the originating PC 412 in order to allow that PC 412 to connect to the destination associated with the primary routing information. Thereafter, the program will flow to a function block 1810 to update the transaction database 1610 for the current transaction. In general, the routing information 1204 will be stored as a single field with the associated IDs. The profile database 1608, as described hereinabove, has associated therewith detailed profiles of each user on the system that has activated their software in association with their ID. Since the ID was sent in association with the routing information, what is stored in the transaction database 1610 is the routing code, in association with all of the IDs transmitted to the system in association with that particular routing code. Once this transaction database 1610 has been updated, as described hereinabove, the transactions can be transferred back to the subscriber at node 612 with the detailed profile information from the profile database 1608.

The profile information can be transmitted back to the subscriber or manufacturer at the node 612 in realtime or non-realtime. A decision block 1812 is provided for this, which determines if the delivery is realtime. If realtime, the program will flow along a "Y" path to a function block 1814 wherein the information will be immediately forwarded to the manufacturer or subscriber. The program will then flow to a function block 1816 wherein the billing for that particular manufacturer or subscriber will be updated in the billing database 1616. The program will then flow into an End block 1818. If it was non-realtime, the program moves along the "N" path to a function block 1820 wherein it is set for a later delivery and it is accrued in the transaction database 1610. In any event, the transaction database 1610 will accrue all information associated with a particular routing code.

It should be noted that the disclosed embodiment is not limited to a single source PC 602, but may encompass a large number of source computers connected over a global communication network. Additionally, the embodiment is not limited to a single ARS 608 or a single advertiser server 612, but may include a plurality of ARS and advertiser systems, indicated by the addition of ARS 614 and advertiser server A 616, respectively. It should also be noted that this embodiment is not limited only to global communication networks, but also may be used with LAN, WAN, and peer-to-peer configurations.

It should also be noted that the disclosed embodiment is not limited to a personal computer, but is also applicable to, for example, a Network Computer ("NetPC"), a scaled-down version of the PC, or any system which accommodates user interaction and interfaces to information resources.

Figure 19:
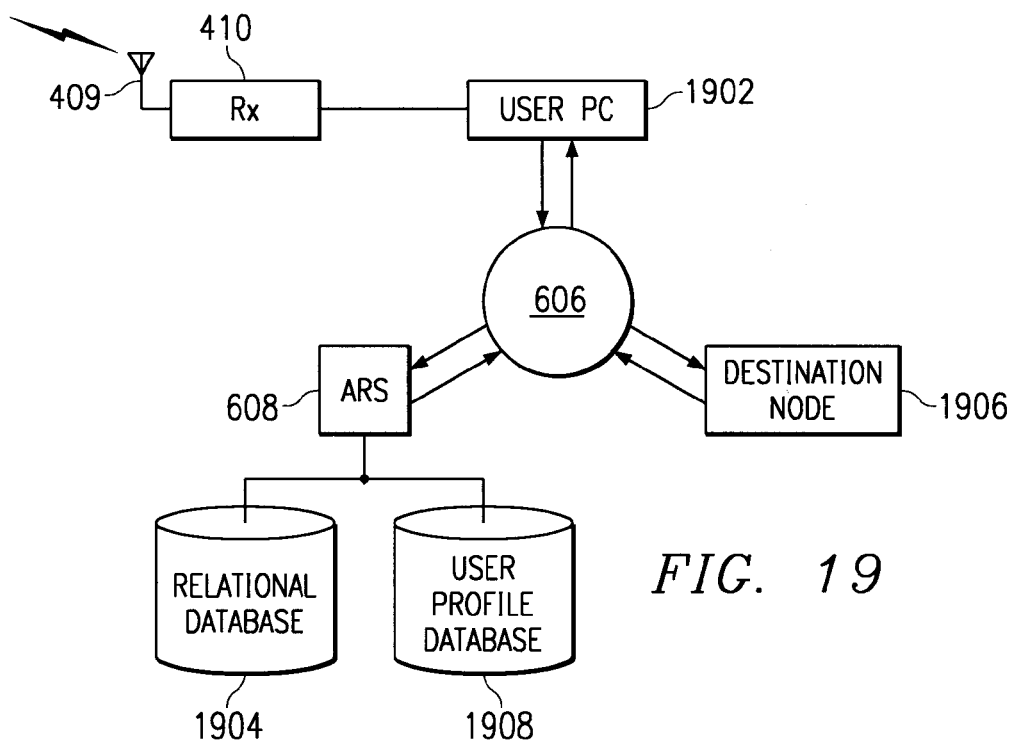
FIG. 19 illustrates a diagrammatic view of the interconnection with the network in the disclosure of FIG. 19.

Referring now to FIG. 19, there is illustrated an overall diagrammatic view of the interconnection over the network of the user PC 412, it being referred to as user PC 1902 in FIG. 19. The user PC 1902 is interconnected with the network 606, as described hereinabove with reference to FIG. 6, to allow the user PC 1902 to forward the received tone to the ARS 608. As described hereinabove, this forwarding operation is facilitated by a detection operation in the user PC 1902. The user PC 1902 detects the presence of the tone within the received broadcast program and then utilizes this information to connect to the ARS 608, in conjunction with stored information in the user PC 1902, and forward the received tone or the information contained therein, or even a portion of the information contained therein, to the ARS 608. The ARS 608 utilizes this information for comparison with a relational database 1904 to define or to correlate the received tone information with routing information for a destination node 1906 on the network 306. Once the ARS 608 has determined that there is routing information that correlates to the tone information received from the user PC 1902, then this information is assembled in a packet and transferred back to the user PC 1902. The user PC 1902 then utilizes this redirected routing information to allow the user PC 1902 to make a connection with the destination node 1906. This destination node 1906 can then transmit information back to the user PC 1902 in the form of a web page or the such. As described hereinabove, a web browser software program is utilized to interface with the ARS 608 and the destination node 1906.

Figure 20:
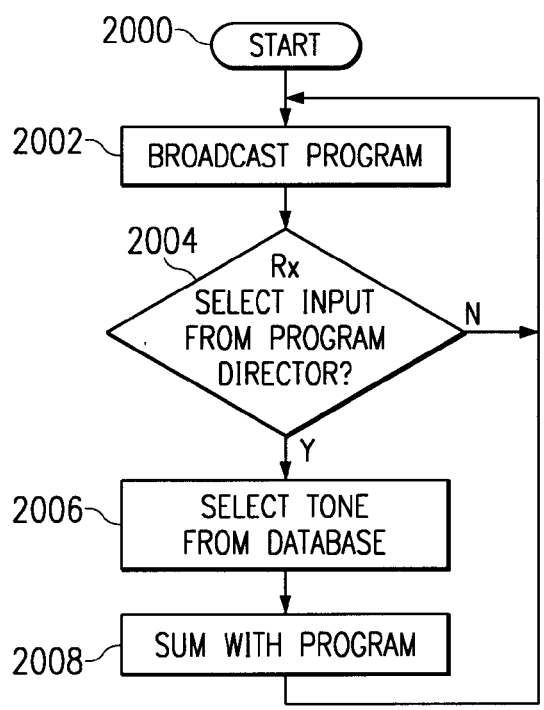
FIG. 20 illustrates a flowchart for the operation of the embodiment of FIG. 19.

Referring now to FIG. 20, there is illustrated a flowchart depicting the operation at the broadcast network. The program is initiated at a block 2000 and then proceeds to a function block 2002 wherein the program is broadcast to the user. The program then proceeds to a decision block 2004 to determine if a select input has been received from the console. If not, the broadcast program will continue to be broadcast. However, when the program director selects a tone to be input, the program will flow along the "Y" path to a function block 2006 wherein the tone will be selected from the database. The program will then flow to a function block 2008 wherein this tone will be summed with the broadcast program and transmitted to the user.

Although the preferred embodiment has been described in detail, it should be understood that various changes, substitutions and alterations can be made therein without departing from the spirit and scope of the invention as defined by the appended claims.

What is claimed is:

1. A method of promoting products to a computer of a user at a first location disposed on a first communication network, comprising the steps of:

inducing, via a broadcast over a second communication network to the user at the first location disposed on the first communication network, the user to obtain a first product of a first advertiser with the opportunity to win a prize, and to register the first product over the first communication network;

broadcasting a gaming event from a remote location over the second communication network to a receiver at the first location, the gaming event having one or more triggering events which initiate a selection process, the user being one of a plurality of selections in the selection process;

transmitting an indicia over the second communication network to the receiver at the first location upon initiation of the selection process, the indicia triggering the presentation of prize-winning information to the user at the first location over the first communication network, wherein the prize-winning information is associated with a second product of a second advertiser which is being promoted; and contacting the user at the first location over a third communication network via a terminal at the first location to obtain the prize-winning information, and awarding the prize to the user if the user responds via the third communication network with the prize-winning information.

2. The method of claim 1, wherein the step of inducing induces the user to register the first product by the user providing user profile information and a unique number of the first product to a registration server disposed on the first communication network, the first communication network being a global packet-switched communication network.

3. The method of claim 2, wherein the selection process initiated by the triggering event is performed by the steps of:

accessing the registration server over the first communication network using an event computer at the remote location;

matching the unique number with a plurality of unique numbers stored on the registration server to obtain an associated user profile; and obtaining contact information of the user from the user profile.

4. The method of claim 1, wherein the indicia is an audible tone which is coupled from the receiver at the first location to the computer at the first location such that the computer accesses a server disposed on the first communication network to display the prize-winning information to the user at the first location.

5. The method of claim 1, wherein the step of contacting occurs over a third communication network which is a public-switched telephone network.

6. The method of claim 1, wherein the step of transmitting triggers presentation of the prize-winning information to a number of users disposed on the first communication network which number of users is substantially known.

7. The method of claim 1, wherein the step of transmitting triggers presentation of the prize-winning information to a number of users disposed on the first communication network which number of users is substantially known such that the second advertiser is billed according to the number of users having the prize-winning information presented thereto.

* * * * *